(12) United States Patent
Lu et al.

(10) Patent No.: US 11,405,965 B2
(45) Date of Patent: Aug. 2, 2022

(54) SIGNALING PROCESSING METHOD AND APPARATUS

(71) Applicant: Huawei Technologies Co., Ltd., Shenzhen (CN)

(72) Inventors: Wei Lu, Shenzhen (CN); Hualin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 17/067,356

(22) Filed: Oct. 9, 2020

(65) Prior Publication Data

US 2021/0029756 A1  Jan. 28, 2021

Related U.S. Application Data

(63) Continuation of application No. PCT/CN2019/081958, filed on Apr. 9, 2019.

(30) Foreign Application Priority Data

Apr. 9, 2018  (CN) .......................... 201810314560.2
Jun. 26, 2018  (CN) .......................... 201810674468.7

(51) Int. Cl.
*H04W 8/08*  (2009.01)
*H04W 76/11*  (2018.01)
(Continued)

(52) U.S. Cl.
CPC .............. *H04W 76/11* (2018.02); *H04W 8/08* (2013.01); *H04W 48/16* (2013.01);
(Continued)

(58) Field of Classification Search
CPC ....... H04W 76/11; H04W 8/08; H04W 48/16; H04W 68/005; H04W 76/25;
(Continued)

(56) References Cited

U.S. PATENT DOCUMENTS

2015/0195743 A1  7/2015  Sirotkin et al.
2015/0215839 A1  7/2015  Johansson et al.
(Continued)

FOREIGN PATENT DOCUMENTS

CN  101669377 A  3/2010
CN  105191398 A  12/2015
(Continued)

OTHER PUBLICATIONS

Qualcomm, TS 23.502, Support of PDU sessions over non-3GPP access for UEs in CM-IDLE state over non-3GPP access., 3GPP SA WG2 Meeting #121, S2-173131, May 15-19, 2017, Hangzhou, P.R. China (Year: 2017).*

(Continued)

*Primary Examiner* — Said M Elnoubi
(74) *Attorney, Agent, or Firm* — Conley Rose, P.C.

(57) ABSTRACT

A signaling processing method and an apparatus relate to the field of communications technologies and include receiving, by an access and mobility management network element, control signaling from a session management network element, where the control signaling includes identification information of a protocol data unit (PDU) session of a terminal, and the PDU session is established based on a non-3rd Generation Partnership Project (3GPP) access network, and determining, by the access and mobility management network element, whether to send a first message to the terminal using a 3GPP access network when the terminal is in an idle mode on the non-3GPP access network, where the first message is triggered by the access and mobility management network element based on the control signaling.

20 Claims, 19 Drawing Sheets

(51) Int. Cl.
H04W 76/25 (2018.01)
H04W 76/30 (2018.01)
H04W 48/16 (2009.01)
H04W 68/00 (2009.01)

(52) U.S. Cl.
CPC ......... *H04W 68/005* (2013.01); *H04W 76/25* (2018.02); *H04W 76/30* (2018.02)

(58) Field of Classification Search
CPC . H04W 76/30; H04W 76/22; H04W 36/0069; H04W 36/0055; H04W 76/19
See application file for complete search history.

(56) References Cited

U.S. PATENT DOCUMENTS

| | | |
|---|---|---|
| 2017/0339609 A1 | 11/2017 | Youn et al. |
| 2019/0037636 A1 | 1/2019 | Kim et al. |

FOREIGN PATENT DOCUMENTS

| | | |
|---|---|---|
| CN | 105794259 A | 7/2016 |
| CN | 109246821 A | 1/2019 |
| CN | 109429366 A | 3/2019 |
| EP | 3490297 A1 | 5/2019 |
| EP | 3713370 A1 | 9/2020 |
| WO | 2015147615 A1 | 10/2015 |
| WO | 2017142362 A1 | 8/2017 |
| WO | 2018006017 A1 | 1/2018 |
| WO | 2018038503 A1 | 3/2018 |

OTHER PUBLICATIONS

3GPP TS 23.501 V15.1.0, "3rd Generation Partnership Project; Technical Specification Group Services and System Aspects; System Architecture for the 5G System; Stage 2 (Release 15)," Mar. 2018, 201 pages.
3GPP TS 23.502 V15.1.0, "3rd Generation Partnership Project; Technical Specification Group Services and System Aspects; Procedures for the 5G System; Stage 2 (Release 15)," Mar. 2018, 285 pages.
3GPP TS 24.501 V1.0.0, "3rd Generation Partnership Project; Technical Specification Group Core Network and Terminals; Non-Access-Stratum (NAS) protocol for 5G System (5GS); Stage 3 (Release 15)," Mar. 2018, 253 pages.
3GPP TS 29.500 V1.0.0, "3rd Generation Partnership Project; Technical Specification Group Core Network and Terminals; 5G System; Technical Realization of Service Based Architecture; Stage 3 (Release 15)," Mar. 2018, 14 pages.
3GPP TS 29.518 V1.0.0, "3rd Generation Partnership Project; Technical Specification Group Core Network and Terminals; 5G System; Access and Mobility Management Services; Stage 3 (Release 15)," Mar. 2018, 94 pages.
3GPP TS 33.501 V15.0.0, "3rd Generation Partnership Project; Technical Specification Group Services and System Aspects; Security architecture and procedures for 5G system (Release 15)," Mar. 2018, 128 pages.
3GPP TS 36.331 V14.6.2, "3rd Generation Partnership Project; Technical Specification Group Radio Access Network; Evolved Universal Terrestrial Radio Access (E-UTRA); Radio Resource Control (RRC); Protocol specification (Release 14)," Apr. 2018, 766 pages.
3GPP TS 38.331 V15.1.0, "3rd Generation Partnership Project; Technical Specification Group Radio Access Network; NR; Radio Resource Control (RRC) protocol specification (Release 15)," Mar. 2018, 268 pages.
3GPP TS 38.413 V0.7.0, "3rd Generation Partnership Project; Technical Specification Group Radio Access Network; NG-RAN; NG Application Protocol (NGAP) (Release 15)," Mar. 2018, 121 pages.
Qualcomm Incorporated, "TS 23.502: Support of PDU sessions over non-3GPP access for UEs in CM-IDLE state over non-3GPP access," SA WG2 Meeting #121, S2-173131, May 15-19, 2017, Hangzhou, P.R. China, 17 pages.
LG Electronics, "DL signalling handling for non-3GPP PDU Session," 3GPP TSG-SA WG2 Meeting #126, S2-182046, Montreal, Canada, Feb. 26-Mar. 2, 2018, 3 pages.
Huawei, et al., "Update of NW-triggered Service Request for N3GPP-only POU session," 3GPP Draft; S2-181930, Feb. 20, 2018, XP051408482, 16 pages.
Tao, L., et al., "SWN: An SDN based framework for carrier grade Wi-Fi networks," Mar. 2016, 15 pages.
Yiqing, W., et al., "QoE based power control scheme for interference mitigation in high-density WLANs," Apr. 2016, 7 pages.

* cited by examiner

SIGNALING PROCESSING METHOD AND APPARATUS

CROSS-REFERENCE TO RELATED APPLICATIONS

This application is a continuation of International Patent Application No. PCT/CN2019/081958 filed on Apr. 9, 2019, which claims priority to Chinese Patent Application No. 201810674468.7 filed on Jun. 26, 2018 and Chinese Patent Application No. 201810314560.2 filed on Apr. 9, 2018. All of the aforementioned patent applications are hereby incorporated by reference in their entireties.

TECHNICAL FIELD

Embodiments of this application relate to the field of communications technologies, and in particular, to a signaling processing method and an apparatus.

BACKGROUND

To face challenges of wireless broadband technologies and maintain the leading position of 3rd Generation Partnership Project (3GPP) networks, the 3GPP standardization group formulated a next generation mobile communications system (next generation system) network architecture at the end of the year 2016, which is referred to as a 5th generation (5G) network architecture. Such an architecture not only supports a terminal in accessing a Public Land Mobile Network (PLMN) using a 3GPP access technology, but also supports the terminal in accessing the PLMN using a non-3GPP access technology.

At present, the PLMN allows to be accessed by a terminal using both the 3GPP access technology and the non-3GPP access technology, and the terminal can establish a protocol data unit (PDU) session separately based on a 3GPP access network and a non-3GPP access network. If the terminal is in an idle mode on the non-3GPP access network, it is considered that the terminal cannot transmit signaling, data, or the like using the non-3GPP access network. In this case, when a network side device (that is, a network element in the PLMN) receives signaling carrying identification information of a PDU session that is established based on the non-3GPP access network, currently no related processing solution has been provided.

SUMMARY

Embodiments of this application provide a signaling processing method and an apparatus, and a solution for processing performed when a network side device (that is, a network element in a PLMN) receives signaling carrying identification information of a PDU session that is established based on a non-3GPP access network.

According to a first aspect, an embodiment of this application provides a signaling processing method. The method may include receiving, by an access and mobility management network element, control signaling from a session management network element, where the control signaling includes identification information of a PDU session of a terminal, and the PDU session is a PDU session established based on a non-3GPP access network, and if the terminal is in an idle mode on the non-3GPP access network, determining, by the access and mobility management network element, whether to send a first message to the terminal using a 3GPP access network, where the first message is triggered by the access and mobility management network element based on the control signaling. It can be learnt that this embodiment of this application provides a solution for processing performed when a network side device (which is the access and mobility management network element) receives signaling carrying identification information of a PDU session that is established based on a non-3GPP access network. In this way, on one hand, if a message is sent to the terminal using the 3GPP access network, the terminal can obtain related information in time, thereby improving user experience. On the other hand, if a message is not sent to the terminal using the 3GPP access network, paging signaling overheads can be reduced.

For example, the access and mobility management network element may correspond to an access and mobility management function (AMF) network element in a 5G network architecture, and the session management network element may correspond to a session management function (SMF) network element in the 5G network architecture.

For example, the control signaling is control signaling in any one of the following procedures (that is, a procedure including the control signaling is any one of the following procedures): a PDU session release procedure, a PDU session modification procedure, a session and service continuity and user plane function management (session continuity, service continuity and user plane path management) procedure (for example, a procedure for a change of a PDU session anchor in a multiple-PDU-session scenario), and a procedure triggered by a downlink data packet (for example, a service request procedure triggered by a downlink data packet).

It should be noted that in this application, a "procedure including the control signaling" and a "procedure related to the control signaling" have a same meaning and are used interchangeably.

For example, the control signaling includes N1N2 message transfer signaling or a message that has a same function as N1N2 message transfer signaling. In addition, when procedures related to control signaling are different, names of the control signaling may be identical or different.

For example, that the first message is triggered by the access and mobility management network element based on the control signaling can be understood as follows. The first message is a message sent by the access and mobility management network element to the terminal as triggered by receiving the control signaling by the access and mobility management network element. A specific implementation of the first message is not limited in this embodiment of this application. For example, the first message may include the identification information of the PDU session or tenth indication information, and the tenth indication information is used to instruct the terminal to initiate a processing procedure related to the PDU session. The processing procedure related to the PDU session may include but is not limited to at least one of the following: a service request procedure, a PDU session release procedure, and a PDU session establishment (including new establishment and re-establishment) procedure.

In a possible design, the control signaling is used to instruct the access and mobility management network element whether to send the first message to the terminal using the 3GPP access network. In this case, determining, by the access and mobility management network element, whether to send a first message to the terminal using a 3GPP access network may include determining, by the access and mobility network element based on the control signaling, whether to send the first message to the terminal using the 3GPP access network. It can be learnt that in this embodiment of this application, the technical solution is supported in which the access and mobility management network element determines, according to an indication of the session management network element (which may be an explicit indication or an implicit indication), whether to send the first message to the terminal using the 3GPP access network. Further, the access and mobility management network element identifies, according to the indication of the session management network element, whether to send the first message to the terminal using the 3GPP access network, and uses an identification result as a reference to determine whether to send the first message to the terminal using the 3GPP access network.

For example, that the control signaling is used to instruct the access and mobility management network element whether to send the first message to the terminal using the 3GPP access network includes one of the following cases. Case 1: The control signaling further includes first indication information, where the first indication information is used to instruct the access and mobility management network element whether to send the first message to the terminal using the 3GPP access network. Case 2: The control signaling further includes or does not include second indication information, where the second indication information is used to instruct the access and mobility management network element to send the first message to the terminal using the 3GPP access network, and if the control signaling does not include the second indication information, the control signaling is used to instruct the access and mobility management network element not to send the first message to the terminal using the 3GPP access network. Case 3: The control signaling further includes or does not include third indication information, where the third indication information is used to instruct the access and mobility management network element not to send the first message to the terminal using the 3GPP access network, and if the control signaling does not include the third indication information, the control signaling is used to instruct the access and mobility management network element to send the first message to the terminal using the 3GPP access network.

In a possible design, the control signaling is used to indicate whether the control signaling is triggered by a control plane or a user plane. In this case, determining, by the access and mobility management network element, whether to send a first message to the terminal using a 3GPP access network may include determining, by the access and mobility management network element based on the control signaling, whether to send the first message to the terminal using the 3GPP access network. It can be learnt that in this embodiment of this application, the session management network element is supported to indicate a reason for triggering the control signaling. The access and mobility management network element may identify, according to an indication of the session management network element, whether the control signaling is triggered by the control plane or the user plane, and use an identification result as a reference to determine whether to send the first message to the terminal using the 3GPP access network.

That the control signaling is triggered by the control plane may include the control signaling is triggered by other control signaling or the SMF network element. That the control signaling is triggered by the user plane may include that the control signaling is triggered by a downlink data packet.

For example, that the control signaling is used to indicate whether the control signaling is triggered by a control plane or a user plane includes one of the following cases. Case 1: The control signaling further includes fourth indication information, where the fourth indication information is used to indicate whether the control signaling is triggered by the control plane or the user plane. Case 2: The control signaling further includes or does not include fifth indication information, where the fifth indication information is used to indicate that the control signaling is triggered by the control plane, and if the control signaling does not include the fifth indication information, the control signaling is used to indicate that the control signaling is triggered by the user plane. Case 3: The control signaling further includes or does not include sixth indication information, where the sixth indication information is used to indicate that the control signaling is triggered by the user plane, and if the control signaling does not include the sixth indication information, the control signaling is used to indicate that the control signaling is triggered by the control plane.

In a possible design, the control signaling further includes seventh indication information, and the seventh indication information is used to indicate a procedure related to the control signaling. In this case, determining, by the access and mobility management network element, whether to send a first message to the terminal using a 3GPP access network may include determining, by the access and mobility management network element based on the seventh indication information, whether to send the first message to the terminal using the 3GPP access network. It can be learnt that in this embodiment of this application, the session management network element is supported to indicate the procedure related to the control signaling. The access and mobility management network element may identify, according to an indication of the session management network element, the procedure related to the control signaling, and use an identification result as a reference to determine whether to send the first message to the terminal using the 3GPP access network.

In a possible design, the control signaling further includes an N1 session management container. In this case, determining, by the access and mobility management network element, whether to send a first message to the terminal using a 3GPP access network may include determining, by the access and mobility management network element based on information in the N1 session management container, whether to send the first message to the terminal using the 3GPP access network. It can be learnt that in this embodiment of this application, the access and mobility management network element is supported to parse the information in the N1 session management container. The access and mobility management network element may identify, by parsing the information included in the N1 session management container, a procedure related to the control signaling, and use an identification result as a reference to determine whether to send the first message to the terminal using the 3GPP access network.

In a possible design, the control signaling further includes or does not include an N1 session management container. In this case, determining, by the access and mobility management network element, whether to send a first message to the terminal using a 3GPP access network may include determining, by the access and mobility management network element based on whether the control signaling further includes the N1 session management container, whether to send the first message to the terminal using the 3GPP access network. The access and mobility management network element may identify, based on whether the control signaling includes the N1 session management container, whether the control signaling is triggered by a control plane or a user plane, and use an identification result as a reference to determine whether to send the first message to the terminal using the 3GPP access network.

In a possible design, the control signaling may further include other information. The other information is information that is other than the N1 session management container and the first indication information to the seventh indication information and that may be used to indicate (explicitly indicate or implicitly indicate) whether the control signaling is triggered by the user plane or the control plane. For example, the other information may be user plane information included in N2 information in the control signaling.

In a possible design, if the access and mobility management network element determines not to send the first message to the terminal using the 3GPP access network, the method may further include sending, by the access and mobility management network element, a response message to the session management network element, where the response message includes at least one of eighth indication information and ninth indication information, the eighth indication information is used to indicate that the terminal is unreachable, and the ninth indication information is used to indicate that the terminal is in an idle mode on the non-3GPP access network. It can be learnt that this embodiment of this application provides a processing procedure performed after the access and mobility management network element determines not to send the first message to the terminal using the 3GPP access network.

In a possible design, if the access and mobility management network element determines to send the first message to the terminal using the 3GPP access network, the method may further include, when the terminal is in an idle mode on the 3GPP access network, the first message includes a paging message, and correspondingly sending, by the access and mobility management network element, the paging message to the terminal using the 3GPP access network, where the paging message is used by the terminal to initiate a service request procedure, or when the terminal is in a connected mode on the 3GPP access network, the first message includes a notification message, and correspondingly sending, by the access and mobility management network element, the notification message to the terminal using the 3GPP access network, where the notification message is used by the terminal to initiate at least one of a PDU session establishment procedure and a PDU session release procedure. It can be learnt that this embodiment of this application provides a processing procedure performed after the access and mobility management network element determines to send the first message to the terminal using the 3GPP access network.

In a possible design, when the procedure related to the control signaling is the PDU session release procedure, the first message includes a PDU session release command and/or instruction information that is used to instruct the terminal to initiate PDU session establishment, or when the procedure related to the control signaling is the PDU session modification procedure, the first message includes a PDU session modification command, or when the procedure related to the control signaling is the session and service continuity and user plane function management procedure, the first message includes a PDU session modification command and a cause value, or when the procedure related to the control signaling is a procedure triggered by a downlink data packet, the first message includes an identifier of the PDU session.

In a possible design, the first message is a message that is sent by the access and mobility management network element to the terminal as triggered by receiving the control signaling by the access and mobility management network element.

According to a second aspect, an embodiment of this application provides a signaling processing method. The method may include determining, by a session management network element, control signaling, where the control signaling includes identification information of a PDU session of a terminal, and the PDU session is a PDU session established based on a non-3GPP access network, and sending, by the session management network element, the control signaling to an access and mobility management network element, where the control signaling is used by the access and mobility management network element to determine, after receiving the control signaling, whether to send a first message to the terminal using a 3GPP access network, if determining that the terminal is in an idle mode on the non-3GPP access network, and the first message is triggered by the access and mobility management network element based on the control signaling.

In a possible design, the control signaling is used to instruct the access and mobility management network element whether to send the first message to the terminal using the 3GPP access network. For a specific implementation, refer to the first aspect.

In a possible design, the control signaling is used to indicate whether the control signaling is triggered by a control plane or a user plane. For a specific implementation, refer to the first aspect.

In a possible design, the control signaling further includes seventh indication information, and the seventh indication information is used to indicate a procedure related to the control signaling.

In a possible design, the method may further include obtaining, by the session management network element from the access and mobility management network element, a connection management status of the terminal on the non-3GPP access network. In this case, the determining, by a session management network element, control signaling may include determining, by the session management network element, the control signaling based on the connection management status, where if the connection management status is an idle mode, the control signaling is used to instruct the access and mobility management network element to send the first message to the terminal using the 3GPP access network.

According to a third aspect, an embodiment of this application provides a signaling processing method. The method may include receiving, by a terminal, a first message from an access and mobility management network element, where the first message is a message that is triggered by the access and mobility management network element based on received control signaling and that is sent, when the terminal is in an idle mode on a non-3GPP access network, by the access and mobility management network element to the terminal using a 3GPP access network, the control signaling includes identification information of a PDU session of the terminal, and the PDU session is a PDU session established based on the non-3GPP access network, and initiating, by the terminal, a processing procedure related to the PDU session based on the first message (for example, after the first message is received) using the 3GPP access network.

In a possible design, the initiating, by the terminal, a processing procedure related to the PDU session based on the first message using the 3GPP access network may include when the terminal is in an idle mode on the 3GPP access network, initiating, by the terminal, a service request procedure, or when the terminal is in a connected mode on the 3GPP access network, initiating, by the terminal, at least one of a PDU session establishment procedure and a PDU session release procedure.

In a possible design, initiating, by the terminal, a processing procedure related to the PDU session based on the first message using the 3GPP access network may include, when the terminal is in a connected mode on the 3GPP access network, initiating, by the terminal, a service request procedure, and initiating at least one of a PDU session establishment procedure and a PDU session release procedure.

In a possible design, initiating, by the terminal, a processing procedure related to the PDU session based on the first message using the 3GPP access network may include initiating, by the terminal, the processing procedure related to the PDU session based on the first message and policy information using the 3GPP access network. For example, the policy information may be a policy as follows. The PDU session indicated by the identification information of the PDU session included in the control signaling can be switched to the 3GPP access network, the PDU session cannot be switched to the 3GPP access network, or the like.

According to a fourth aspect, an embodiment of this application provides a signaling processing apparatus. The apparatus may be configured to perform any method provided in the first aspect. The apparatus may be the access and mobility management network element described in the first aspect. In an example, the apparatus may be a chip.

In a possible design, division of functional modules may be performed on the apparatus using the method provided in the first aspect. For example, each functional module may be obtained through division in correspondence to each function, or at least two functions may be integrated into one processing module (or one processing unit). For example, the apparatus may include a communications unit and a processing unit.

In a possible design, the communications unit is configured to receive control signaling from a session management network element, where the control signaling includes identification information of a PDU session of a terminal, and the PDU session is a PDU session established based on a non-3GPP access network, and the processing unit is configured to, if the terminal is in an idle mode on the non-3GPP access network, determine whether to send a first message to the terminal using a 3GPP access network, where the first message is triggered by the access and mobility management network element based on the control signaling.

In a possible design, the control signaling is used to instruct the access and mobility management network element whether to send the first message to the terminal using the 3GPP access network. In this case, the processing unit may be configured to determine, based on the control signaling, whether to send the first message to the terminal using the 3GPP access network. The control signaling is used to instruct the access and mobility management network element whether to send the first message to the terminal using the 3GPP access network. For a specific implementation thereof, refer to the first aspect. Details are not described herein again.

In a possible design, the control signaling is used to indicate whether the control signaling is triggered by a control plane or a user plane. In this case, the processing unit may further be configured to determine, based on the control signaling, whether to send the first message to the terminal using the 3GPP access network. The control signaling is used to indicate whether the control signaling is triggered by the control plane or the user plane. For a specific implementation thereof, refer to the first aspect. Details are not described herein again.

In a possible design, the control signaling further includes seventh indication information, and the seventh indication information is used to indicate a procedure related to the control signaling. In this case, the processing unit may further be configured to determine, based on the seventh indication information, whether to send the first message to the terminal using the 3GPP access network.

In a possible design, the procedure related to the control signaling includes any one of the following procedures: a PDU session release procedure, a PDU session modification procedure, and a session and service continuity and user plane function management procedure.

In a possible design, the control signaling further includes an N1 session management container. In this case, the processing unit may further be configured to determine, based on information in the N1 session management container, whether to send the first message to the terminal using the 3GPP access network.

In a possible design, the control signaling further includes or does not include an N1 session management container. In this case, the processing unit may further be configured to determine, based on whether the control signaling further includes the N1 session management container, whether to send the first message to the terminal using the 3GPP access network.

In a possible design, the control signaling includes N1N2 message transfer signaling.

In a possible design, if the processing unit determines not to send the first message to the terminal using the 3GPP access network, the communications unit may further be configured to send a response message to the session management network element, where the response message includes at least one of eighth indication information and ninth indication information, the eighth indication information is used to indicate that the terminal is unreachable, and the ninth indication information is used to indicate that the terminal is in an idle mode on the non-3GPP access network.

In a possible design, if the processing unit determines to send the first message to the terminal using the 3GPP access network, the communications unit may further be configured to, when the terminal is in an idle mode on the 3GPP access network, the first message includes a paging message, and correspondingly send the paging message to the terminal using the 3GPP access network, where the paging message is used by the terminal to initiate a service request procedure, or when the terminal is in a connected mode on the 3GPP access network, the first message includes a notification message, and correspondingly send the notification message to the terminal using the 3GPP access network, where the notification message is used by the terminal to initiate at least one of a PDU session establishment procedure and a PDU session release procedure.

In a possible design, the first message includes the identification information of the PDU session or tenth indication information, and the tenth indication information is used to instruct the terminal to initiate a processing procedure related to the PDU session.

In a possible design, the control signaling is control signaling in any one of the following procedures: a PDU session release procedure, a PDU session modification procedure, and a session and service continuity and user plane function management procedure.

In a possible design, when the procedure related to the control signaling is the PDU session release procedure, the first message includes a PDU session release command and/or instruction information that is used to instruct the terminal to initiate PDU session establishment, when the procedure related to the control signaling is the PDU session modification procedure, the first message includes a PDU session modification command, when the procedure related to the control signaling is the session and service continuity and user plane function management procedure, the first message includes a PDU session modification command and a cause value, or when the procedure related to the control signaling is a procedure triggered by a downlink data packet, the first message includes an identifier of the PDU session.

In a possible design, the first message is a message that is sent by the access and mobility management network element to the terminal as triggered by receiving the control signaling by the access and mobility management network element.

In a possible design, the apparatus may include a memory and a processor. The memory is configured to store program code, and when the program code is executed by the processor, any method provided in the first aspect is performed.

According to a fifth aspect, an embodiment of this application provides a signaling processing apparatus. The apparatus may be configured to perform any method provided in the second aspect. The apparatus may be the session management network element described in the second aspect. In an example, the apparatus may be a chip.

In a possible design, division of functional modules may be performed on the apparatus using the method provided in the second aspect. For example, each functional module may be obtained through division in correspondence to each function, or at least two functions may be integrated into one processing module (or one processing unit). For example, the apparatus may include a communications unit and a processing unit.

In a possible design, the processing unit is configured to determine control signaling, where the control signaling includes identification information of a PDU session of a terminal, and the PDU session is a PDU session established based on a non-3GPP access network, and the communications unit is configured to send the control signaling to an access and mobility management network element, where the control signaling is used by the access and mobility management network element to determine, after receiving the control signaling, whether to send a first message to the terminal using a 3GPP access network, if determining that the terminal is in an idle mode on the non-3GPP access network, and the first message is triggered by the access and mobility management network element based on the control signaling.

In a possible design, the control signaling is used to instruct the access and mobility management network element whether to send the first message to the terminal using the 3GPP access network. For a specific implementation thereof, refer to the first aspect.

In a possible design, the control signaling is used to indicate whether the control signaling is triggered by a control plane or a user plane. For a specific implementation thereof, refer to the first aspect.

In a possible design, the control signaling further includes seventh indication information, and the seventh indication information is used to indicate a procedure related to the control signaling. For a specific implementation of the procedure related to the control signaling, refer to the first aspect.

In a possible design, the communications unit is further configured to obtain, from the access and mobility management network element, a connection management status of the terminal on the non-3GPP access network. In this case, the processing unit may further be configured to determine the control signaling based on the connection management status, where if the connection management status is an idle mode, the control signaling is used to instruct the access and mobility management network element to send the first message to the terminal using the 3GPP access network.

In a possible design, the control signaling includes N1N2 message transfer signaling.

In a possible design, the control signaling is control signaling in any one of the following procedures: a PDU session release procedure, a PDU session modification procedure, and a session and service continuity and user plane function management procedure.

In a possible design, the apparatus may include a memory and a processor. The memory is configured to store program code, and when the program code is executed by the processor, any method provided in the second aspect is performed.

According to a sixth aspect, an embodiment of this application provides a signaling processing apparatus. The apparatus may be configured to perform any method provided in the third aspect. The apparatus may be the terminal described in the third aspect. In an example, the apparatus may be a chip.

In a possible design, division of functional modules may be performed on the apparatus using the method provided in the third aspect. For example, each functional module may be obtained through division in correspondence to each function, or at least two functions may be integrated into one processing module (or one processing unit). For example, the apparatus includes a communications unit and a processing unit.

In a possible design, the communications unit is configured to receive a first message from an access and mobility management network element, where the first message is a message that is triggered by the access and mobility management network element based on received control signaling and that is sent, when the terminal is in an idle mode on a non-3GPP access network, by the access and mobility management network element to the terminal using a 3GPP access network, the control signaling includes identification information of a PDU session of the terminal, and the PDU session is a PDU session established based on the non-3GPP access network, and the processing unit is configured to initiate a processing procedure related to the PDU session based on the first message using the 3GPP access network.

In a possible design, the processing unit may further be configured to, when the terminal is in an idle mode on the 3GPP access network, initiate a service request procedure, or when the terminal is in a connected mode on the 3GPP access network, initiate at least one of a PDU session establishment procedure and a PDU session release procedure.

In a possible design, the processing unit may further be configured to, when the terminal is in a connected mode on the 3GPP access network, initiate a service request procedure, and initiate at least one of a PDU session establishment procedure and a PDU session release procedure.

In a possible design, the processing unit may further be configured to initiate the processing procedure related to the PDU session based on the first message and policy information using the 3GPP access network.

In a possible design, the apparatus may include a memory and a processor. The memory is configured to store program code, and when the program code is executed by the processor, any method provided in the third aspect is performed.

According to a seventh aspect, an embodiment of this application further provides a signaling processing method. The method may include determining, by an access and mobility management network element, third control signaling, where the third control signaling includes identification information of a terminal and information related to a non-3GPP access network, and if the terminal is in an idle mode on the non-3GPP access network, determining, by the access and mobility management network element based on the information related to the non-3GPP access network included in the third control signaling, whether to send a second message to the terminal using a 3GPP access network, where the second message is triggered by the access and mobility management network element based on the third control signaling. In this way, on one hand, if a message is sent to the terminal using the 3GPP access network, the terminal can obtain related information in time, thereby improving user experience. On the other hand, if a message is not sent to the terminal using the 3GPP access network, paging signaling overheads can be reduced.

For example, the information related to the non-3GPP access network may be slice information related to non-3GPP.

For example, the third control signaling may include a user equipment (UE) configuration update message or signaling related to a PDU session release procedure triggered by an AMF network element such as downlink non-access stratum (NAS) transport signaling (or downlink NAS transport message).

According to an eighth aspect, an embodiment of this application provides a signaling processing method. The method may include receiving, by a terminal, a second message sent by an access and mobility management network element, where the second message is a message that is triggered by the access and mobility management network element based on third control signaling and that is sent, when the terminal is in an idle mode on a non-3GPP access network, by the access and mobility management network element to the terminal using a 3GPP access network, the third control signaling includes identification information of a PDU session of the terminal, and the PDU session is a PDU session established based on the non-3GPP access network, and initiating, by the terminal, a processing procedure related to the PDU session based on the second message using the 3GPP access network.

According to a ninth aspect, an embodiment of this application provides a signaling processing apparatus. The apparatus may be configured to perform any method provided in the seventh aspect. The apparatus may be the access and mobility management network element described in the seventh aspect. In an example, the apparatus may be a chip.

In a possible design, division of functional modules may be performed on the apparatus using the method provided in the seventh aspect. For example, each functional module may be obtained through division in correspondence to each function, or at least two functions may be integrated into one processing module (or one processing unit). For example, the apparatus may include a processing unit.

In a possible design, the processing unit is configured to determine third control signaling, where the third control signaling includes identification information of a terminal and information related to a non-3GPP access network, and if the terminal is in an idle mode on the non-3GPP access network, determine, based on the information related to the non-3GPP access network included in the third control signaling, whether to send a second message to the terminal using a 3GPP access network, where the second message is triggered by the access and mobility management network element based on the third control signaling.

In a possible design, the apparatus may include a memory and a processor. The memory is configured to store program code, and when the program code is executed by the processor, any method provided in the seventh aspect is performed.

According to a tenth aspect, an embodiment of this application provides a signaling processing apparatus. The apparatus may be configured to perform any method provided in the eighth aspect. The apparatus may be the terminal described in the eighth aspect. In an example, the apparatus may be a chip.

In a possible design, division of functional modules may be performed on the apparatus using the method provided in the eighth aspect. For example, each functional module may be obtained through division in correspondence to each function, or at least two functions may be integrated into one processing module (or one processing unit). For example, the apparatus may include a communications unit and a processing unit.

In a possible design, the communications unit is configured to receive a second message sent by an access and mobility management network element, where the second message is a message that is triggered by the access and mobility management network element based on third control signaling and that is sent, when the terminal is in an idle mode on a non-3GPP access network, by the access and mobility management network element to the terminal using a 3GPP access network, the third control signaling includes identification information of a PDU session of the terminal, and the PDU session is a PDU session established based on the non-3GPP access network, and the processing unit is configured to initiate a processing procedure related to the PDU session based on the second message using the 3GPP access network.

In a possible design, the apparatus may include a memory and a processor. The memory is configured to store program code, and when the program code is executed by the processor, any method provided in the eighth aspect is performed.

According to an eleventh aspect, an embodiment of this application provides a message processing method. The method may include receiving, by a terminal, a second message from an access and mobility management network element using a 3GPP access network, where the second message includes control information specific to a first PDU session, the control information is triggered by a control plane, and the first PDU session is a PDU session established based on a non-3GPP access network, and sending, by the terminal, a third message to the access and mobility management network element based on the second message, where the third message is used to instruct to reject a procedure related to the PDU session. In the technical solution, a solution is provided for processing performed by the terminal in a scenario in which the terminal receives, using the 3GPP access network, the control information specific to the PDU session that is established based on the non-3GPP access network, and further describes rejection of the procedure related to the PDU session. The solution is proposed in consideration of a scenario in which the terminal receives, using an access technology type, control information specific to another access technology type, and it is possible that the control information cannot be normally used for a PDU session established based on the other access technology type.

For example, the second message may be a NAS message. In this case, the control information specific to the first PDU session may be carried in an N1 session management container in the NAS message. Certainly, this application is not limited thereto.

In a possible design, if the control information includes a modification command specific to the first PDU session, the third message is further used to instruct to reject a modification procedure specific to the first PDU session, that is, reject modification of the first PDU session.

In a possible design, if the control information includes a release command specific to the first PDU session, the third message is further used to instruct to reject initiation of an establishment procedure specific to a second PDU session after the first PDU session is released, where the second PDU session has a same data network name (DNN) attribute as the first PDU session. In an example, rejecting initiation of the establishment procedure specific to the second PDU session may include rejecting initiation of the establishment procedure specific to the second PDU session performed using the 3GPP access network. Rejecting initiation of the establishment procedure specific to the second PDU session may be replaced with rejecting the establishment procedure specific to the second PDU session.

In a possible design, before sending, by the terminal, a third message to the access and mobility management network element based on the second message, the method may further include receiving, by the terminal, indication information from the access and mobility management network element, where the indication information is used to indicate that the first PDU session is activated on the 3GPP access network or is used to indicate that the first PDU session is not activated on the 3GPP access network. In this case, the sending, by the terminal, a third message to the access and mobility management network element based on the second message may include sending, by the terminal, the third message to the access and mobility management network element based on the second message and the indication information. In this possible design, the terminal determines whether to reject the procedure related to the PDU session based on whether the first PDU session is activated on the 3GPP access network, in addition to the second message.

For example, if the indication information is used to indicate that the first PDU session is activated on the 3GPP access network and the control information includes a modification command specific to the first PDU session, the third message is used to instruct to reject a modification procedure specific to the first PDU session.

For example, if the indication information is used to indicate that the first PDU session is not activated on the 3GPP access network and the control information includes a release command specific to the first PDU session, the third message is used to instruct to reject initiation of an establishment procedure specific to a second PDU session after the first PDU session is released, where the second PDU session has a same DNN attribute as the first PDU session.

For analyses of specific examples, refer to the Description of Embodiments section below. Details are not described herein.

In a possible design, when the indication information is used to indicate that the first PDU session is activated on the 3GPP access network, the method may further include changing, by the terminal, an access technology type of the first PDU session from a non-3GPP access technology to a 3GPP access technology based on the indication information, and recording information indicating that the access technology type of the first PDU session is changed. In this case, sending, by the terminal, a third message to the access and mobility management network element based on the second message may include sending, by the terminal, the third message to the access and mobility management network element based on the second message and the recorded information. In this possible design, the terminal may determine, based on the information recorded in the terminal, that the access technology type, to which the received control information is applied, of the PDU session is the non-3GPP access technology, and then send the third message to the access and mobility management network element.

In a possible design, when the indication information is used to indicate that the first PDU session is activated on the 3GPP access network, the method may further include changing, by the terminal, an access technology type of the first PDU session from a non-3GPP access technology to a 3GPP access technology based on the indication information. In this case, sending, by the terminal, a third message to the access and mobility management network element based on the second message may include, when the second message further includes indication information indicating the access technology type (where in this possible design, the access technology is the non-3GPP access technology), to which the control information is applied, of the PDU session, sending, by the terminal, the third message to the access and mobility management network element based on the second message. In this possible design, the terminal may determine, based on the indication information included in the second message, that the received control information is applied to the PDU session established based on the non-3GPP access network, and then send the third message to the access and mobility management network element.

In a possible design, the third message includes a cause value, and the cause value is used to indicate a reason for rejecting the procedure related to the PDU session. For example, the cause value may include information indicating that the access technology type of the first PDU session is the non-3GPP access technology. Certainly, this embodiment of this application is not limited thereto. It can be learnt that in this embodiment of this application, the technical solution is supported in which the terminal sends the reason for rejecting the procedure related to the PDU session to the access and mobility management network element.

According to a twelfth aspect, an embodiment of this application provides a message processing method. The method may include determining, by a session management network element, control information specific to a PDU session of a terminal, and indication information indicating an access technology type, to which the control information is applied, of the PDU session, and sending, by the session management network element, the control information and the indication information to the terminal using an access and mobility management network element. The access technology type indicated by the indication information may be, for example, a 3GPP access technology or a non-3GPP access technology. In this way, the terminal can learn the access technology type, to which the received control information is applied, of the PDU session. In an example, the technical solution allows the terminal to determine, when using an access network (for example, a 3GPP access network) to receive control information that is based on another access network (for example, a non-3GPP access network), whether to reject a procedure related to the PDU session. This is merely an application scenario in this embodiment. Certainly, this application is not limited thereto.

The technical solution provided in the twelfth aspect may be replaced with the following. The session management network element determines control information specific to a PDU session of a terminal, where the control information includes indication information indicating an access technology type, to which the control information is applied, of the PDU session, and the session management network element sends the control information to the terminal using an access and mobility management network element. For an interpretation of related content and a description of beneficial effects in the technical solution, refer to the twelfth aspect. Details are not described herein again.

According to a thirteenth aspect, an embodiment of this application provides a message processing method. The method may include receiving, by an access and mobility management network element, control signaling from a session management network element, where the control signaling includes identification information of a PDU session of a terminal, and the PDU session is a PDU session established based on a non-3GPP access network, and if the control signaling is triggered by a control plane, rejecting, by the access and mobility management network element, activation of the PDU session on a 3GPP access network. For example, the control signaling may be a Namf_Communication_N1N2MessageTransfer message. This helps avoid incorrect processing performed on the control signaling caused by a change of an access technology type of the PDU session.

According to a fourteenth aspect, an embodiment of this application provides a message processing apparatus. The apparatus may be configured to perform any method provided in the eleventh aspect. The apparatus may be the terminal described in the eleventh aspect. In an example, the apparatus may be a chip.

In a possible design, division of functional modules may be performed on the apparatus using the method provided in the eleventh aspect. For example, each functional module may be obtained through division in correspondence to each function, or at least two functions may be integrated into one processing module (or one processing unit). For example, the apparatus includes a communications unit, and optionally may include a processing unit.

In a possible design, the communications unit is configured to receive a second message from an access and mobility management network element using a 3GPP access network, where the second message includes control information specific to a first PDU session, the control information is triggered by a control plane, and the first PDU session is a PDU session established based on a non-3GPP access network, and send a third message to the access and mobility management network element based on the second message, where the third message is used to instruct to reject a procedure related to the PDU session.

In a possible design, if the control information includes a modification command specific to the first PDU session, the third message is used to instruct to reject a modification procedure specific to the first PDU session, that is, reject modification of the first PDU session.

In a possible design, if the control information includes a release command specific to the first PDU session, the third message is used to instruct to reject initiation of an establishment procedure specific to a second PDU session after the first PDU session is released, where the second PDU session has a same DNN attribute as the first PDU session.

In a possible design, the communications unit may further be configured to receive indication information from the access and mobility management network element, where the indication information is used to indicate that the first PDU session is activated on the 3GPP access network or is used to indicate that the first PDU session is not activated on the 3GPP access network. In this case, sending, by the communications unit, a third message to the access and mobility management network element based on the second message may include sending the third message to the access and mobility management network element based on the second message and the indication information.

For example, if the indication information is used to indicate that the first PDU session is activated on the 3GPP access network and the control information includes a modification command specific to the first PDU session, the third message is used to instruct to reject a modification procedure specific to the first PDU session.

For example, if the indication information is used to indicate that the first PDU session is not activated on the 3GPP access network and the control information includes a release command specific to the first PDU session, the third message is used to instruct to reject initiation of an establishment procedure specific to a second PDU session after the first PDU session is released, where the second PDU session has a same DNN attribute as the first PDU session.

In a possible design, when the indication information is used to indicate that the first PDU session is activated on the 3GPP access network, the processing unit may be configured to change an access technology type of the first PDU session from a non-3GPP access technology to a 3GPP access technology based on the indication information, and record information indicating that the access technology type of the first PDU session is changed. In this case, the sending, by the communications unit, a third message to the access and mobility management network element based on the second message may include sending the third message to the access and mobility management network element based on the second message and the recorded information.

In a possible design, when the indication information is used to indicate that the first PDU session is activated on the 3GPP access network, the processing unit may be configured to change an access technology type of the first PDU session from a non-3GPP access technology to a 3GPP access technology based on the indication information. In this case, the sending, by the communications unit, a third message to the access and mobility management network element based on the second message may include when the second message further includes indication information indicating the access technology type (where in this possible design, the access technology is the non-3GPP access technology), to which the control information is applied, of the PDU session, sending the third message to the access and mobility management network element based on the second message.

In a possible design, the third message includes a cause value, and the cause value is used to indicate a reason for rejecting the procedure related to the PDU session. For example, the cause value may include information indicating that the access technology type of the first PDU session is the non-3GPP access technology. Certainly, this embodiment of this application is not limited thereto.

In a possible design, the apparatus may include a memory and a processor. The memory is configured to store program code, and when the program code is executed by the processor, any method provided in the eleventh aspect is performed.

According to a fifteenth aspect, an embodiment of this application provides a message processing apparatus. The apparatus may be configured to perform any method provided in the twelfth aspect. The apparatus may be the session management network element described in the twelfth aspect.

In a possible design, division of functional modules may be performed on the apparatus using the method provided in the twelfth aspect. For example, each functional module may be obtained through division in correspondence to each function, or at least two functions may be integrated into one processing module (or one processing unit). For example, the apparatus includes a communications unit and a processing unit.

In a possible design, the processing unit may be configured to determine control information specific to a PDU session of a terminal, and indication information indicating an access technology type, to which the control information is applied, of the PDU session, and the communications unit may be configured to send the control information and the indication information to the terminal using an access and mobility management network element. The access technology type indicated by the indication information may be, for example, a 3GPP access technology or a non-3GPP access technology.

In a possible design, the processing unit may be configured to determine control information specific to a PDU session of a terminal, where the control information includes an identifier of the PDU session of the terminal and an access technology type (that is, the non-3GPP access technology type) of the PDU session, and the PDU session is a PDU session established based on a non-3GPP access network, and the communications unit is configured to send the control information to an access and mobility management network element.

In a possible design, the apparatus may include a memory and a processor. The memory is configured to store program code, and when the program code is executed by the processor, any method provided in the twelfth aspect is performed.

According to a sixteenth aspect, an embodiment of this application provides a message processing apparatus. The apparatus may be configured to perform any method provided in the thirteenth aspect. The apparatus may be the access and mobility management network element described in the thirteenth aspect.

In a possible design, division of functional modules may be performed on the apparatus using the method provided in the thirteenth aspect. For example, each functional module may be obtained through division in correspondence to each function, or at least two functions may be integrated into one processing module (or one processing unit). For example, the apparatus includes a communications unit and a processing unit.

In a possible design, the communications unit may be configured to receive control signaling from a session management network element, where the control signaling includes identification information of a PDU session of a terminal, and the PDU session is a PDU session established based on a non-3GPP access network, and the processing unit may be configured to if the control signaling is triggered by a control plane, reject activation of the PDU session on a 3GPP access network.

In a possible design, the apparatus may include a memory and a processor. The memory is configured to store program code, and when the program code is executed by the processor, any method provided in the thirteenth aspect is performed.

According to a seventeenth aspect, an embodiment of this application further provides a processing apparatus configured to implement a function of any one of the foregoing signaling (or message) processing apparatuses. The processing apparatus includes a processor and an interface, and the processing apparatus may be a chip. The processor may be implemented by hardware or software. When being implemented by hardware, the processor may be a logic circuit, an integrated circuit, or the like. When being implemented by software, the processor may be a general purpose processor and is implemented by reading software code stored in a memory. The memory may be integrated into the processor, or may be located outside the processor, and exist independently.

An embodiment of this application further provides a signaling (or message) processing system. The system may include any signaling processing apparatus provided in the fourth aspect and the corresponding signaling processing apparatus provided in the fifth aspect. Optionally, the system may further include the corresponding signaling processing apparatus provided in the sixth aspect.

An embodiment of this application further provides a message processing system. The system may include an access and mobility management network element and any terminal that is provided in the fourteenth aspect. Optionally, the system may further include the corresponding message processing apparatus provided in the fifteenth aspect.

An embodiment of this application further provides a message processing system. The system may include a session management network element and the message processing apparatus that is provided in the sixteenth aspect. Optionally, the system may further include a terminal.

An embodiment of this application further provides a computer-readable storage medium. The computer-readable storage medium stores program code, and the program code includes instructions for performing some or all of steps in any method provided in the first aspect.

An embodiment of this application further provides a computer-readable storage medium. The computer-readable storage medium stores program code, and the program code includes instructions for performing some or all of steps in any method provided in the second aspect.

An embodiment of this application further provides a computer-readable storage medium. The computer-readable storage medium stores program code, and the program code includes instructions for performing some or all of steps in any method provided in the third aspect.

An embodiment of this application further provides a computer-readable storage medium. The computer-readable storage medium stores program code, and the program code includes instructions for performing some or all of steps in any method provided in the seventh aspect.

An embodiment of this application further provides a computer-readable storage medium. The computer-readable storage medium stores program code, and the program code includes instructions for performing some or all of steps in any method provided in the eighth aspect.

An embodiment of this application further provides a computer-readable storage medium. The computer-readable storage medium stores program code, and the program code includes instructions for performing some or all of steps in any method provided in the eleventh aspect.

An embodiment of this application further provides a computer-readable storage medium. The computer-readable storage medium stores program code, and the program code includes instructions for performing some or all of steps in any method provided in the twelfth aspect.

An embodiment of this application further provides a computer-readable storage medium. The computer-readable storage medium stores program code, and the program code includes instructions for performing some or all of steps in any method provided in the thirteenth aspect.

An embodiment of this application further provides a computer program product. When run on a computer, the computer program product enables the computer to perform some or all of steps in any method provided in the first aspect.

An embodiment of this application further provides a computer program product. When run on a computer, the computer program product enables the computer to perform some or all of steps in any method provided in the second aspect.

An embodiment of this application further provides a computer program product. When run on a computer, the computer program product enables the computer to perform some or all of steps in any method provided in the third aspect.

An embodiment of this application further provides a computer program product. When run on a computer, the computer program product enables the computer to perform some or all of steps in any method provided in the seventh aspect.

An embodiment of this application further provides a computer program product. When run on a computer, the computer program product enables the computer to perform some or all of steps in any method provided in the eighth aspect.

An embodiment of this application further provides a computer program product. When run on a computer, the computer program product enables the computer to perform some or all of steps in any method provided in the eleventh aspect.

An embodiment of this application further provides a computer program product. When run on a computer, the computer program product enables the computer to perform some or all of steps in any method provided in the twelfth aspect.

An embodiment of this application further provides a computer program product. When run on a computer, the computer program product enables the computer to perform some or all of steps in any method provided in the thirteenth aspect.

For a specific implementation and beneficial effects of any one of the signaling processing apparatuses, the processing apparatuses, the computer-readable storage media, the computer program products, and the like that are described above, refer to the first aspect or the seventh aspect in the foregoing description. Details are not described herein again.

It should be noted that in the embodiments of this application, "signaling" and "message" have the same meaning and are used interchangeably. Such a definition applies throughout this application, and is not repeatedly described in the following description.

DESCRIPTION OF EMBODIMENTS

For ease of understanding technical solutions in embodiments of this application, technologies related to this application are first described briefly.

Figure 1:
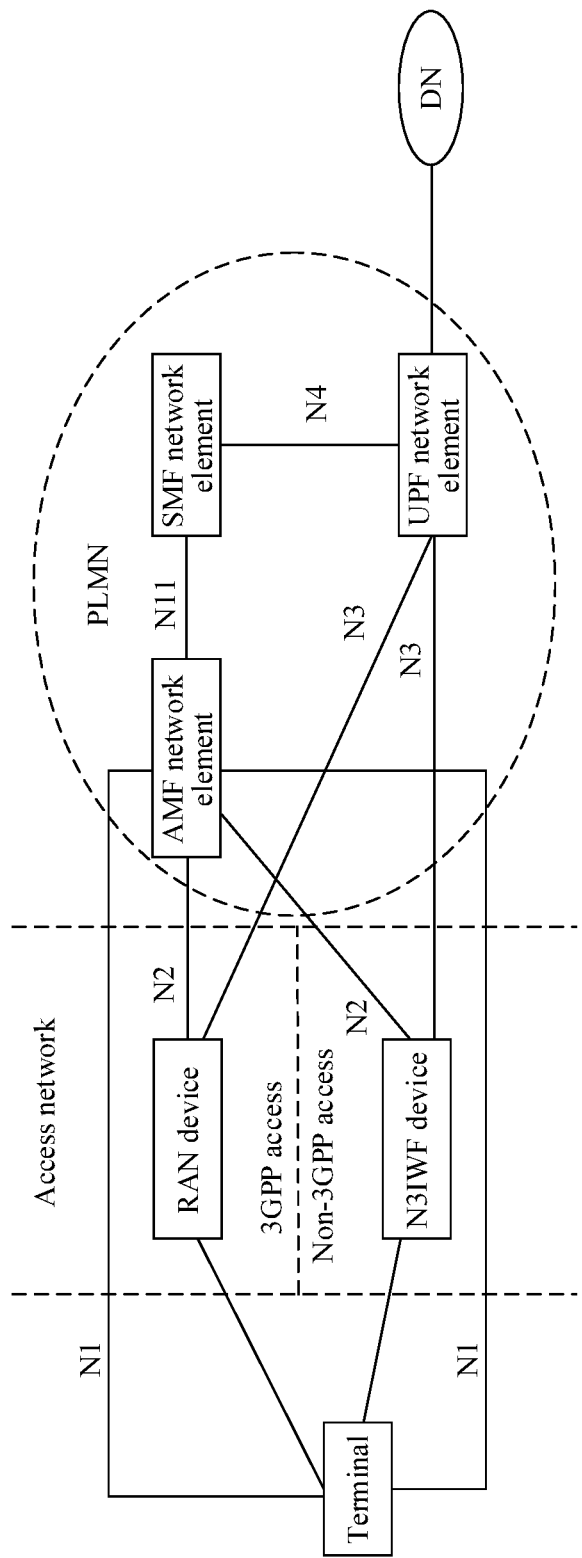
FIG. 1 is a schematic diagram of a 5G network architecture that is applicable to an embodiment of this application.

FIG. 1 shows a 5G network architecture according to an embodiment of this application. Such an architecture not only supports a terminal in accessing a PLMN using a 3GPP access technology, but also supports the terminal in accessing the PLMN using a non-3GPP access technology. The 3GPP access technology in this embodiment of this application may be a radio access technology for a radio access network (RAN) in 5G, another 3GPP access technology in the future, or the like. The non-3GPP access technology may be a WI-FI access technology, a Worldwide Interoperability for Microwave Access (WIMAX) technology, a code-division multiple access (CDMA) access technology, another non-3GPP access technology in the future, or the like. This is not limited in this embodiment of this application.

As shown in FIG. 1, when accessing the PLMN using the 3GPP access technology, the terminal accesses the PLMN using a RAN device, or when accessing the PLMN using the non-3GPP access technology, the terminal accesses the PLMN using an untrusted non-3GPP access point and a non-3GPP interworking function (N3IWF) device. The PLMN may include an AMF network element, an SMF network element, and a user plane function (UPF) network element. The RAN device or the N3IWF device may access a data network (DN) using the UPF network element. The AMF network element is responsible for access and mobility management, and the like. The SMF network element is responsible for session management and the like. The UPF network element is responsible for data packet routing and forwarding, and the like.

The terminal communicates with the AMF network element through a next generation (N) 1 interface (N1). The RAN device or the N3IWF device communicates with the AMF network element through an N2 interface (N2). The RAN device or the N3IWF device communicates with the UPF network element through an N3 interface (N3). The SMF network element communicates with the UPF network element through an N4 interface (N4). The AMF network element communicates with the SMF network element through an N11 interface (N11). It should be noted that names of the interfaces between the network elements in FIG. 1 are merely examples, and the interfaces may have other names during specific implementation. This is not limited in this embodiment of this application.

Optionally, the RAN device in this embodiment of this application is a device accessing the PLMN using the 3GPP access technology. For example, the RAN device may be a base station, a broadband network gateway (BNG), or an aggregation switch. This is not limited in this embodiment of this application. The base station may include various types of base stations, for example, a macro base station, a micro base station (also referred to as a small cell), a relay node, and an access point. This is not limited in this embodiment of this application.

Optionally, the N3IWF device in this embodiment of this application is a device accessing the PLMN using the non-3GPP access technology. For example, the N3IWF device may be a BNG, a broadband remote access server (BRAS), a fixed-network access gateway, or a wireless local area network (WLAN) access gateway. This is not limited in this embodiment of this application.

It should be noted that for the RAN device, the N3IWF device, the AMF network element, the SMF network element, and the UPF network element in FIG. 1, names do not constitute any limitation on the devices. In a 5G network and another network in the future, the RAN device, the N3IWF device, the AMF network element, the SMF network element, and the UPF network element may have other names. This is not limited in this embodiment of this application. For example, the N3IWF device may be replaced with a next generation packet data gateway (NG-PDG), a non-3GPP interworking function (N3IWF) network element, an untrusted non-3GPP access gateway, a trusted non-3GPP access gateway, or a fixed-network access gateway function (AGF). For example, the AMF network element may be replaced with an AMF, an AMF entity, or the like. For example, the SMF network element may be replaced with an SMF, an SMF entity, or the like. Such a definition applies throughout this application, and is not repeatedly described in the following description.

Moreover, the PLMN may further include a unified data management (UDM) network element, an authentication server function (AUSF) network element, a policy control function (PCF) network element, and the like. This is not limited in this embodiment of this application.

Optionally, in this embodiment of this application, the terminal may access different AMF network elements in a same PLMN using the 3GPP access technology and the non-3GPP access technology. Alternatively, according to an existing mechanism, the terminal may access one AMF network element in a same PLMN using the 3GPP access technology and the non-3GPP access technology. Alternatively, the terminal may access different AMF network elements in different PLMNs using the 3GPP access technology and the non-3GPP access technology. This is not limited in this embodiment of this application.

Figure 2:
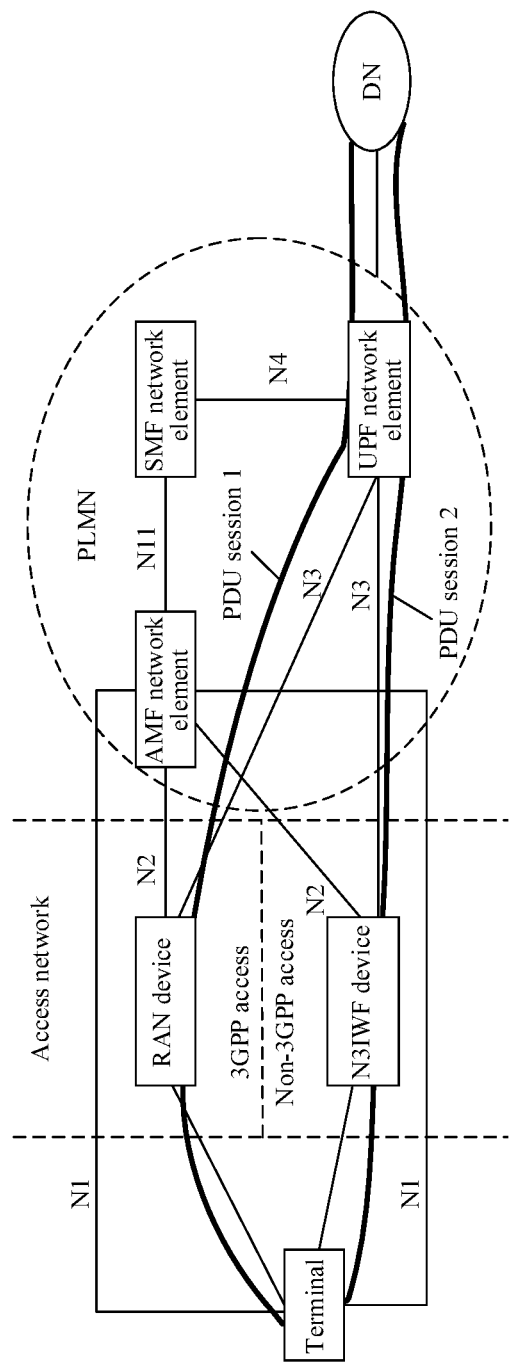
FIG. 2 is a schematic diagram of PDU sessions that are established based on a 3GPP access network and a non-3GPP access network and that is applicable to an embodiment of this application.

The PLMN allows to be accessed by the terminal using both the 3GPP access technology and the non-3GPP access technology, and the terminal can establish a PDU session separately based on a 3GPP access network and a non-3GPP access network, as shown in FIG. 2. A PDU session 1 in FIG. 2 represents the PDU session established by the terminal based on the 3GPP access network, and a PDU session 2 in FIG. 2 represents the PDU session established by the terminal based on the non-3GPP access network.

The following describes the technical solutions in the embodiments of this application with reference to the accompanying drawings in the embodiments of this application. In descriptions of this application, "/" means "or" unless otherwise specified. For example, A/B may represent A or B. In this specification, "and/or" describes only an association relationship for describing associated objects, and represents that three relationships may exist. For example, A and/or B may represent the following three cases: only A exists, both A and B exist, and only B exists. In addition, in the descriptions of this application, "a plurality of" means two or more unless otherwise specified. In addition, for ease of clear description of the technical solutions in the embodiments of this application, terms such as "first" and "second" are used in the embodiments of this application to distinguish between same items having a basically same function and effect or similar items. A person skilled in the art can understand that the terms such as "first" and "second" are not used to limit a quantity and an execution sequence, and that the terms such as "first" and "second" are unnecessarily limited to be different.

A network architecture and a service scenario that are described in the embodiments of this application are intended to describe the technical solutions in the embodiments of this application more clearly, and do not constitute any limitation on the technical solutions provided in the embodiments of this application. A person of ordinary skill in the art can know that with evolution of the network architecture and emergence of new service scenarios, the technical solutions provided in the embodiments of this application are also applicable to similar technical issues. In addition, a name of a message described in the embodiments of this application does not constitute any limitation on the message. Such a definition applies throughout this application, and is not repeatedly described in the following description. For example, in a service-oriented architecture, a message may also be referred to as a service.

Figure 3:
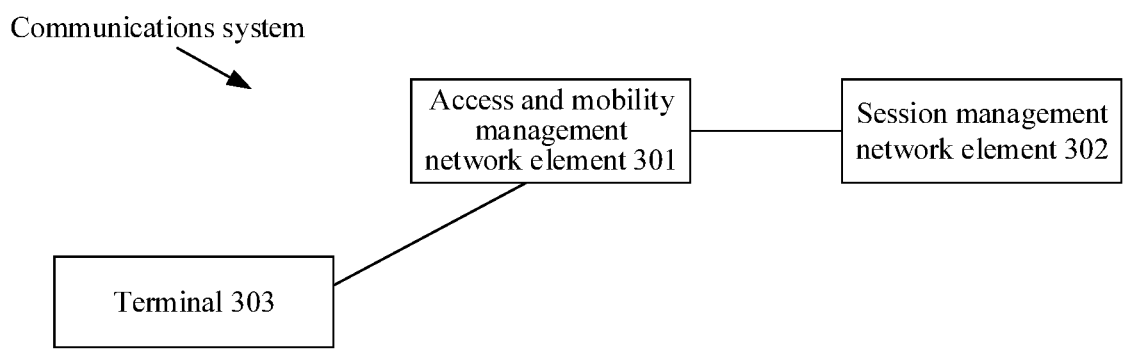
FIG. 3 is a schematic diagram of a communications system according to an embodiment of this application.

FIG. 3 is a schematic diagram of a communications system according to an embodiment of this application. As shown in FIG. 3, the system may include an access and mobility management network element 301, a session management network element 302, and a terminal 303. The session management network element 302 is configured to determine first control signaling and send the first control signaling to the access and mobility management network element 301. The first control signaling includes identification information of a PDU session of the terminal 303, and the PDU session is a PDU session established based on a non-3GPP access network. The access and mobility management network element 301 is configured to receive the first control signaling from the session management network element 302, and if the terminal 303 is in an idle mode on the non-3GPP access network, determine whether to send a first message to the terminal 303 using a 3GPP access network. The first message is triggered by the access and mobility management network element 301 based on the first control signaling. The "first control signaling" described in this specification may be "control signaling" described in the claims section and the summary section.

Optionally, a procedure related to the first control signaling may include any one of the following procedures: a PDU session release procedure, a PDU session modification procedure, a session and service continuity and user plane function management procedure (for example, a procedure for a change of a PDU session anchor in a multiple-PDU-session scenario), and a procedure triggered by a downlink data packet (for example, a service request procedure triggered by a downlink data packet). Certainly, this application is not limited thereto. The procedure related to the first control signaling can be understood as a procedure including the first control signaling.

Optionally, the first control signaling may include N1N2 message transfer signaling, for example, a Namf_Communication_N1N2MessageTransfer message. The N1N2 message transfer signaling is used by the access and mobility management network element 301 to send N1 information or N2 information to an access network device or the terminal 303. The N1N2 message transfer signaling may have other names during specific implementation. This is not limited in this embodiment of this application. In this embodiment of this application, an example is used for description in which when procedures related to the first control signaling are different, names of the first control signaling are the same, that is, the first control signaling is N1N2 message transfer signaling. In an example, when the procedures related to the first control signaling are different, the names of the first control signaling may alternatively be different. In this case, the access and mobility management network element 301 can determine the procedures related to the first control signaling based on the names of the first control signaling. For example, when the procedure related to the first control signaling is the PDU session release procedure, a name of the first control signaling may be first control signaling 1. When the procedure related to the first control signaling is the PDU session modification procedure, a name of the first control signaling may be first control signaling 2. When the procedure related to the first control signaling is the session and service continuity and user plane function management procedure, a name of the first control signaling may be first control signaling 3.

Optionally, the first message may be used by the terminal 303 to initiate a processing procedure related to the PDU session. For example, the first message may include the identification information of the PDU session (that is, the identification information of the PDU session included in the first control signaling) or tenth indication information, and the tenth indication information is used to instruct the terminal 303 to initiate the processing procedure related to the PDU session. A specific procedure included in the processing procedure related to the PDU session initiated by the terminal 303 is not limited in this embodiment of this application. For example, the processing procedure related to the PDU session may include a service request procedure, a PDU session release procedure, and/or a PDU session establishment procedure. The PDU session establishment procedure may be initiated after the service request procedure is completed.

Optionally, the terminal 303 may be configured to, after receiving the first message, initiate the processing procedure related to the PDU session based on the first message using the 3GPP access network. For a specific implementation, refer to the following description.

It should be noted that in this embodiment of this application, communication between the session management network element 302 and the access and mobility management network element 301 may further be direct communication, or may be indirect communication performed using another network element. Such a definition applies throughout this application, and is not repeatedly described in the following description. Communication between the access and mobility management network element 301 and the terminal 303 is usually indirect communication performed by the access and mobility management network element 301 using a device in an access network.

It can be learnt that this embodiment of this application provides a solution for processing performed when a network side device (which is the access and mobility management network element 301) receives control signaling (for example, the first control signaling) carrying identification information of a PDU session that is established based on the non-3GPP access network.

Optionally, this embodiment of this application further provides a processing procedure performed after the access and mobility management network element 301 determines not to send the first message to the terminal 303 using the 3GPP access network. Further, the access and mobility management network element 301 may further be configured to send a response message to the session management network element 302, where the response message includes at least one of eighth indication information and ninth indication information. The eighth indication information is used to indicate that the terminal 303 is unreachable, and the ninth indication information is used to indicate that the terminal 303 is in an idle mode on the non-3GPP access network. The session management network element 302 may further be configured to receive the response message. After receiving the eighth indication information and/or the ninth indication information, the session management network element 302 can learn that the terminal 303 is unreachable. That the terminal is unreachable can be understood as follows. The access and mobility management network element cannot establish a connection to the terminal. Subsequently, optionally, the session management network element 302 may subscribe to a connection management status of the terminal 303 from the access and mobility management network element 301 such that after the terminal 303 switches from the idle mode to a connected mode on the non-3GPP access network, the access and mobility management network element 301 notifies the session management network element 302 that the terminal 303 is reachable. Alternatively, optionally, after a preset time period, the session management network element 302 may send the first control signaling to the access and mobility management network element 301 again, to re-determine whether the terminal 303 is reachable. Certainly, this embodiment of this application is not limited thereto.

Optionally, this embodiment of this application further provides a processing procedure performed after the access and mobility management network element 301 determines to send the first message to the terminal 303 using the 3GPP access network. Details are as follows.

In an implementation, when the terminal 303 is in an idle mode on the 3GPP access network, the first message may include a paging message. The paging message is used by the terminal 303 to initiate a service request procedure in order to establish a signaling connection, and perform a subsequent signaling processing procedure, for example, establish a PDU session. The access and mobility management network element 301 may further be configured to send the paging message to the terminal 303. The terminal 303 may be configured to receive the paging message, and initiate the service request procedure based on the paging message. Subsequently, the terminal 303 and the access and mobility management network element 301 may participate in the service request procedure. In addition, after the service request procedure is performed, the access and mobility management network element 301 may further be configured to send a notification message to the terminal 303. The terminal 303 may further be configured to receive the notification message, and initiate a PDU session release procedure and/or a PDU session establishment procedure.

In an implementation, when the terminal 303 is in a connected mode on the 3GPP access network, the first message may include a notification message. The access and mobility management network element 301 may further be configured to send the notification message to the terminal 303. The terminal 303 may further be configured to receive the notification message, and initiate a PDU session release procedure and/or a PDU session establishment procedure.

Optionally, the terminal 303 may further be configured to initiate the processing procedure related to the PDU session based on the first message and policy information. The policy information may be some policy information stored in the terminal 303, for example, configuration information that is preset by a user in the terminal 303. The policy information may alternatively be some policies obtained by the terminal 303 from the network side device (such as a PCF network element), for example, a UE route selection policy (URSP) information obtained by the terminal 303 from the PCF network element. For example, the policy information may be a policy as follows. The PDU session indicated by the identification information of the PDU session included in the first control signaling can be switched to the 3GPP access network, the PDU session cannot be switched to the 3GPP access network, or the like.

Optionally, when the technical solution provided in this embodiment of this application is applied to a 5G network architecture, the access and mobility management network element 301 may be an AMF network element, and the session management network element 302 may be an SMF network element.

Optionally, terminals (terminal) in this embodiment of this application may include various devices: a handheld device having a wireless communication function, a vehicle-mounted device, a wearable device, a computing device, and another processing device connected to a wireless modem. The terminals may further include a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, UE, a mobile station (MS), a terminal device, and the like. For ease of description, the devices mentioned above are all referred to as terminals in this application.

With reference to the accompanying drawings, the following describes a signaling processing method provided in the embodiments of this application. It should be noted that the following uses an example for description in which the access and mobility management network element 301 is an AMF network element and the session management network element 302 is an SMF network element.

Figure 4:
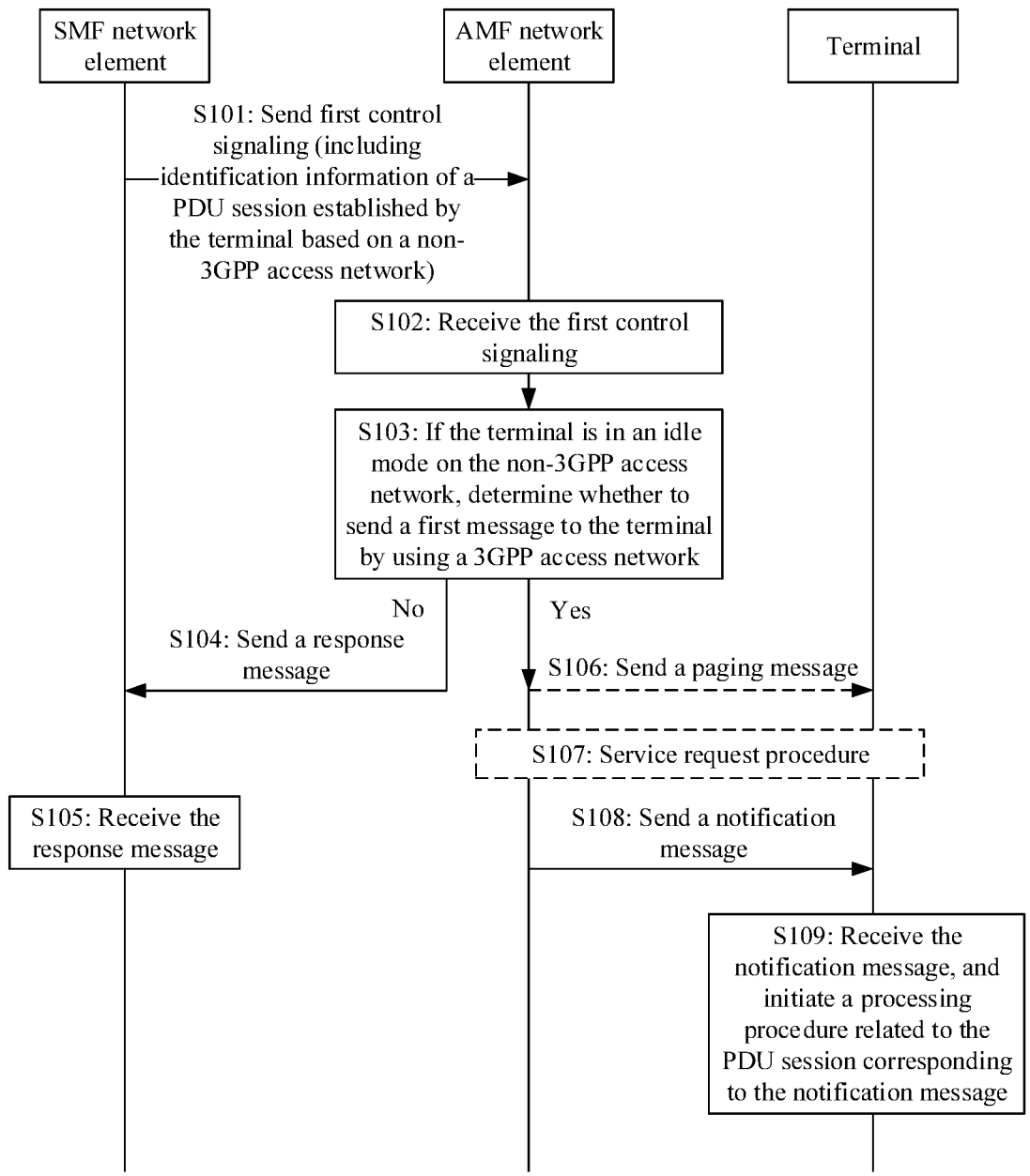
FIG. 4 is a schematic interaction diagram of a signaling processing method according to an embodiment of this application.

FIG. 4 is a schematic interaction diagram of a signaling processing method according to an embodiment of this application. The method shown in FIG. 4 may include the following steps.

S101: An SMF network element sends first control signaling to an AMF network element. The first control signaling may include identification information of a PDU session of a terminal. The identification information of the PDU session is used to identify the PDU session. The PDU session is any PDU session established by the terminal based on a non-3GPP access network. For example, the PDU session may be the PDU session 2 in FIG. 2.

S102: The AMF network element receives the first control signaling sent by the SMF network element.

It can be understood that the AMF network element may maintain information such as identification information of a PDU session established by the terminal and an access technology type of the PDU session indicated by the identification information of the PDU session. The access technology type of the PDU session includes a 3GPP access technology type and a non-3GPP access technology type.

After receiving the first control signaling, the AMF network element may determine, based on the identification information of the PDU session included in the first control signaling and the access technology type, maintained by the AMF network element, of the PDU session indicated by the identification information of the PDU session, an access technology type of the PDU session indicated by the identification information of the PDU session included in the first control signaling, and after determining that the access technology type is the non-3GPP access technology type, that is, after determining that the PDU session indicated by the identification information of the PDU session included in the first control signaling is the PDU session established based on the non-3GPP access network, perform S103.

S103: If the terminal is in an idle mode on the non-3GPP access network, the AMF network element determines whether to send a first message to the terminal using a 3GPP access network, where the first message is triggered by the AMF network element based on the first control signaling.

That the first message is triggered by the AMF network element based on the first control signaling can be understood as follows. The first message is a message sent by the access and mobility management network element to the terminal as triggered by receiving the first control signaling by the access and mobility management network element.

In an example, assuming that a procedure related to the first control signaling is a PDU session release procedure, when the SMF network element has a requirement of requesting PDU session release, the SMF network element sends a Namf_Communication_N1N2MessageTransfer message (that is, the first control signaling) to the AMF network element. The message is used by the AMF network element to send the first message to the terminal, and the first message may include a PDU session release command, instruction information that is used to instruct the terminal to initiate PDU session establishment (including new establishment and re-establishment), and/or the like.

In another example, assuming that a procedure related to the first control signaling is a PDU session modification procedure, when the SMF network element has a requirement of requesting PDU session modification, the SMF network element sends a Namf_Communication_N1N2MessageTransfer message (that is, the first control signaling) to the AMF network element. The message is used by the AMF network element to send the first message to the terminal, and the first message may include information such as a PDU session modification command.

In still another example, assuming that a procedure related to the first control signaling is a session and service continuity and user plane function management procedure, for example, a procedure for a change of a session and service continuity mode-3 (SSC mode 3) PDU session anchor with multiple PDU sessions (change of SSC mode 3 PDU session anchor with multiple PDU sessions), when the SMF network element decides that a UPF network element or the SMF network element needs to perform relocation, the SMF network element sends a Namf_Communication_N1N2MessageTransfer message (that is, the first control signaling) to the AMF network element. The message includes an N1 SM Container, the N1 SM Container includes a PDU session modification command and a cause value, and the information included in the N1 SM Container is session management-related information used for parsing by the terminal. The terminal performs a corresponding operation based on the information. Actually, the AMF network element usually does not parse the information in the other approaches. The message is used by the AMF network element to send the first message to the terminal, and the first message may include information such as the PDU session modification command and the cause value.

In yet another example, assuming that a procedure related to the first control signaling is a procedure triggered by a downlink data packet, for example, a service request procedure triggered by a downlink data packet, after receiving the downlink data packet, the UPF network element may send a data notification message to the SMF network element, and after receiving the data notification message, the SMF network element may send a Namf_Communication_N1N2MessageTransfer message to the AMF network element. The message is used by the AMF network element to send the first message to the terminal, and the first message may include information such as an identifier of a PDU session.

How the AMF network element determines a connection management status (which may be an idle mode or a connected mode) of the terminal on the non-3GPP access network, and determines a connection management status of the terminal on the 3GPP access network in the following description is not limited in this embodiment of this application. For example, for details, refer to the other approaches. In addition, how the AMF network element determines whether to send the first message to the terminal using the 3GPP access network is not limited in this embodiment of this application. For details, refer to the following description.

Optionally, if the AMF network element determines not to send the first message to the terminal using the 3GPP access network, the AMF network element performs S104.

Optionally, if the AMF network element determines to send the first message to the terminal using the 3GPP access network, when the terminal is in an idle mode on the 3GPP access network, the AMF network element performs S106, or when the terminal is in a connected mode on the 3GPP access network, the AMF network element performs S108.

S104: The AMF network element sends a response message to the SMF network element, where the response message includes eighth indication information and/or ninth indication information, the eighth indication information is used to indicate that the terminal is unreachable, and the ninth indication information is used to indicate that the terminal is in an idle mode on the non-3GPP access network.

S105: The SMF network element receives the response message sent by the AMF network element.

After S105 is performed, the process ends.

S106: The AMF network element sends a paging message to the terminal, where the paging message may be used by the terminal to initiate a service request procedure.

S107: The terminal performs the service request procedure, to implement a signaling connection between the AMF network element and the terminal.

It can be understood that the AMF network element may participate in the service request procedure. For details, refer to the other approaches. After the signaling connection is established between the terminal and the AMF network element, the AMF network element may perform S108.

S108: The AMF network element sends a notification message to the terminal using the 3GPP access network. The notification message is used by the terminal to initiate a corresponding processing procedure related to the PDU session (referred to as a processing procedure related to the PDU session corresponding to the notification message below), for example, a PDU session release procedure and/or a PDU session establishment procedure.

The PDU session release procedure is a procedure for releasing the PDU session (which is the PDU session indicated by the identification information of the PDU session included in the first control signaling) that is established based on the non-3GPP access network. The PDU session establishment procedure is a procedure for establishing (including newly establishing and re-establishing) the PDU session based on the 3GPP access network. The PDU session release procedure and the PDU session establishment procedure have been described in detail in the other approaches. Details are not described herein.

It can be understood that information included in the notification message may be determined by the AMF network element based on some or all of information included in the first control signaling. For example, the notification message may include the identification information of the PDU session included in the first control signaling and the like.

S109: The terminal receives the notification message, and initiates the processing procedure related to the PDU session corresponding to the notification message.

After S109 is performed, the process ends.

Optionally, after S102, concurrent with S103 to S109, the method may further include, if the terminal is in a connected mode on the non-3GPP access network, determining, by the AMF network element, to send the first message to the terminal using the non-3GPP access network. For a specific implementation process, refer to the other approaches. Details are not described herein.

It can be understood that during specific implementation, the procedure described above may correspond to a corresponding step of the PDU session modification procedure requested by a network side, or a corresponding step of the PDU session release procedure requested by a network side, or corresponding steps of the service request procedure, the session and service continuity and user plane function management procedure, and the like that are initiated by a network side. This is not described in detail in this application.

It can be learnt from FIG. 4 and the foregoing description, this embodiment of this application provides a specific implementation solution performed when the terminal is in an idle mode on the non-3GPP access network after the AMF network element receives signaling (that is, the first control signaling) including the identifier of the PDU session that is established based on the non-3GPP access network. Further, the AMF network element may determine whether to send the first message to the terminal using the 3GPP access network. In this way, on one hand, if a message is sent to the terminal using the 3 GPP access network, the terminal can obtain related information in time, thereby improving user experience. On the other hand, if a message is not sent to the terminal using the 3GPP access network, paging signaling overheads can be reduced.

How the AMF network element determines, when the terminal is in an idle mode on the non-3GPP access network, whether to send the first message to the terminal using the 3GPP access network is not limited in this embodiment of this application. For details, refer to any one of the following manner 1 to manner 4.

Manner 1: The AMF network element may determine, according to an indication of the SMF network element (which may be an explicit indication or an implicit indication), whether to send the first message to the terminal using the 3GPP access network.

For example, the SMF network element may determine, based on whether the first control signaling is triggered by a control plane or a user plane, whether the AMF network element can send the first message to the terminal using the 3GPP access network. For another example, the SMF network element may determine, based on a specific procedure related to the first control signaling, whether the AMF network element can send the first message to the terminal using the 3GPP access network. For still another example, the SMF network element may determine, based on a reason for triggering the procedure related to the first control signaling, whether the AMF network element can send the first message to the terminal using the 3GPP access network. Certainly, this application is not limited thereto.

How the SMF network element instructs the AMF network element is not limited in this embodiment of this application. Any one of the following manners 1A to 1C may be included.

Figure 5A:
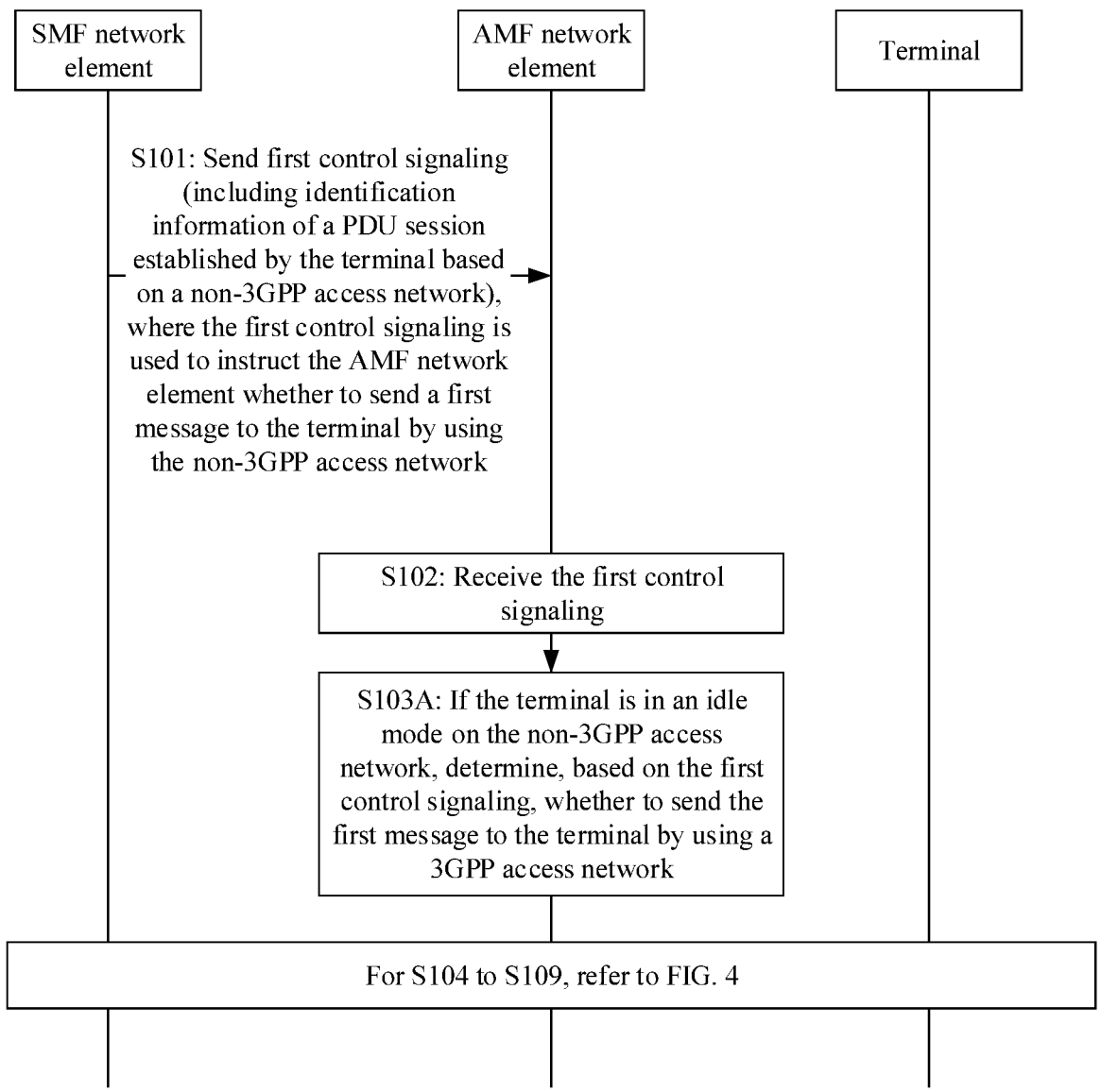
FIG. 5A is a schematic interaction diagram of a signaling processing method according to an embodiment of this application.

Manner 1A: The first control signaling is used to instruct the AMF network element whether to send the first message to the terminal using the 3GPP access network. Based on the manner 1A, as shown in FIG. 5A, S103 may include S103A.

S103A: If the terminal is in an idle mode on the non-3GPP access network, the AMF network element determines, based on the first control signaling, whether to send the first message to the terminal using the 3GPP access network. Further, the AMF network element may identify, based on the first control signaling, whether to send the first message to the terminal using the 3GPP access network, as indicated by the SMF network element, and may use an identification result as a reference to determine whether to send the first message to the terminal using the 3GPP access network.

Optionally, based on the manner 1A, before S101, the method may further include obtaining, by the SMF network element from the AMF network element, the connection management status (including an idle mode and a connected mode) of the terminal on the 3GPP access network. If the connection management status is the idle mode, the first control signaling is used to instruct the AMF network element to send the first message to the terminal using the 3GPP access network.

Optionally, that the first control signaling is used to instruct the AMF network element whether to send the first message to the terminal using the 3GPP access network includes one of the following cases.

Case 1A-1: The first control signaling further includes first indication information, where the first indication information is used to instruct the AMF network element whether to send the first message to the terminal using the 3GPP access network.

Further, the first control signaling may carry first indication information having different content, to instruct the AMF network element whether to send the first message to the terminal using the 3GPP access network. For example, a binary digit "1" may be carried to instruct the AMF network element to send the first message to the terminal using the 3GPP access network, and a binary digit "0" may be carried to instruct the AMF network element not to send the first message to the terminal using the 3GPP access network. Certainly, this application is not limited thereto.

Based on the case 1A-1, optionally, S103A may include, if the terminal is in an idle mode on the non-3GPP access network, when the first indication information included in the first control signaling is used to instruct the AMF network element to send the first message to the terminal using the 3GPP access network, the AMF network element determines to send the first message to the terminal using the 3GPP access network, or when the first indication information included in the first control signaling is used to instruct the AMF network element not to send the first message to the terminal using the 3GPP access network, the AMF network element determines not to send the first message to the terminal using the 3GPP access network. Certainly, this application is not limited thereto.

Case 1A-2: The first control signaling further includes or does not include second indication information, where the second indication information is used to instruct the AMF network element to send the first message to the terminal using the 3GPP access network, and if the first control signaling does not include the second indication information, the first control signaling is used to instruct the AMF network element not to send the first message to the terminal using the 3GPP access network.

Based on the case 1A-2, optionally, S103A may include, if the terminal is in an idle mode on the non-3GPP access network, when the first control signaling includes the second indication information, the AMF network element determines to send the first message to the terminal using the 3GPP access network, or when the first control signaling does not include the second indication information, the AMF network element determines not to send the first message to the terminal using the 3GPP access network. Certainly, this application is not limited thereto.

For example, the second indication information may include any one or more of the following information: N2 session management information (N2 SM information), an N1 message container, an N2 information container, a paging priority indication, and the like.

Case 1A-3: The first control signaling further includes or does not include third indication information, where the third indication information is used to instruct the AMF network element not to send the first message to the terminal using the 3GPP access network, and if the first control signaling does not include the third indication information, the first control signaling is used to instruct the AMF network element to send the first message to the terminal using the 3GPP access network.

Based on the case 1A-3, optionally, S103A may include, if the terminal is in an idle mode on the non-3GPP access network, when the first control signaling includes the third indication information, the AMF network element determines not to send the first message to the terminal using the 3GPP access network, or when the first control signaling does not include the third indication information, the AMF network element determines to send the first message to the terminal using the 3GPP access network. Certainly, this application is not limited thereto.

For example, the third indication information may be a skip indication. In this case, optionally, the method may further include, if the SMF network element determines that the AMF network element does not send the first message to the terminal using the 3GPP access network, the first control signaling includes the skip indication, or if the SMF network element determines that the AMF network element sends the first message to the terminal using the 3GPP access network, the first control signaling does not include the skip indication.

It should be noted that, currently the skip indication is indication information that is used when the PDU session established based on the 3GPP access network is released. Further, for the PDU session established based on the 3GPP access network, during a PDU session release procedure, if the SMF network element determines, after the PDU session is released (for example, an operation for an SSC mode-2 PDU session is performed), to instruct the terminal to establish a PDU session, the first control signaling generated by the SMF network element does not include the skip indication. If the SMF network element determines, after the PDU session is released (for example, an operation for a non-SSC mode-2 PDU session is performed), that the terminal does not need to be instructed to establish a PDU session, the first control signaling generated by the SMF network element includes the skip indication.

However, for the PDU session established based on the non-3GPP access network, during a PDU session release procedure, if the network side device determines, after the PDU session is released, to instruct the terminal to establish a PDU session, the terminal cannot establish the PDU session based on the non-3GPP access network when the terminal is in an idle mode on the non-3GPP access network. Therefore, a condition for "the first control signaling in this application includes the skip indication" may be different from the condition for "the first control signaling in the procedure for releasing the PDU session that is established based on the 3GPP access network includes the skip indication". For example, in this application, if the SMF network element determines to release the PDU session that is established based on the non-3GPP access network, and instructs the terminal to establish the PDU session specific to a DN of the PDU session, the SMF network element may generate the "skip indication". That is, when the terminal is in an idle mode on the non-3GPP, the terminal is not instructed to establish the PDU session. For example, the SMF network element may alternatively generate the skip indication based on a specific reason for releasing the PDU session. For example, if the PDU session is released due to a load status, the first control signaling generated by the SMF network element includes the skip indication, otherwise, the first control signaling generated by the SMF network element does not include the skip indication. For another example, if the PDU session is released because the UPF network element is changed based on a request of an application function (AF) network element, the first control signaling generated by the SMF network element includes the skip indication, otherwise, the first control signaling generated by the SMF network element does not include the skip indication. Certainly, this application is not limited thereto.

The foregoing describes an example for description in which the skip indication generated by the SMF network element is applied to the PDU session release procedure. In this application, the skip indication may also be applied to a PDU session modification procedure, a session and service continuity and user plane function management procedure (for example, a procedure for a change of a PDU session anchor in a multiple-PDU-session scenario), or other procedures. The SMF network element generates the "skip indication" such that the AMF network element determines not to send the first message to the terminal using the 3GPP access network.

It can be understood that based on the manner 1A, the SMF network element and the AMF network element can pre-agree specific indication information (which may be the first indication information, the second indication information, or the third indication information) in the first control signaling that is used to instruct (explicitly instruct or implicitly instruct) the AMF network element whether to send the first message to the terminal using the 3GPP access network. That is, the SMF network element and the AMF network element pre-agree a specific case in which the AMF network element is instructed whether to send the first message to the terminal using the 3GPP access network.

It can be understood that, that "if the first control signaling instructs the AMF network element to send the first message to the terminal using the 3GPP access network, the AMF network element determines to send the first message to the terminal using the 3GPP access network, or if the first control signaling instructs the AMF network element not to send the first message to the terminal using the 3GPP access network, the AMF network element determines not to send the first message to the terminal using the 3GPP access network" is used as an example for description in all the optional implementations in the three cases of the manner 1A. In addition, the AMF network element can use the indication of the SMF network element only as a reference, and unnecessarily performs an operation according to the indication of the SMF network element. For example, even if the SMF network element instructs the AMF network element to send the first message to the terminal using the 3GPP access network, the AMF network element may determine not to send the first message to the terminal using the 3GPP access network, or even if the SMF network element instructs the AMF network element not to send the first message to the terminal using the 3GPP access network, the AMF network element may determine to send the first message to the terminal using the 3GPP access network. Further, the AMF network element may further determine whether to send the first message to the terminal using the 3GPP access network, depending on an actual requirement such as policy information of an operator or a load status of the AMF network element in addition to using the indication of the SMF network element as a reference.

It can be understood that, that "the indication of the SMF network element means that the SMF network element uses the first control signaling to instruct the AMF network element whether to send the first message to the terminal using the 3GPP access network" is used as an example for description in all the three cases of the manner 1A. In addition, control signaling different from the first control signaling may alternatively be used for indication. Further, the control signaling may be used to instruct the AMF network element whether to send the first message to the terminal using the 3GPP access network, or whether the control signaling is sent may be used to instruct the AMF network element whether to send the first message to the terminal using the 3GPP access network.

Manner 1B: The first control signaling is used to indicate whether the first control signaling is triggered by a control plane or a user plane. That is, in this manner, the AMF network element may determine, based on a granularity of a type of a reason for triggering the first control signaling (that is, whether the first control signaling is triggered by the control plane or the user plane), whether to send the first message to the terminal using the 3GPP access network.

In an example, that the first control signaling is triggered by the control plane may include that the first control signaling is triggered by second control signaling. For example, when the first control signaling is N1N2 message transfer signaling, if the procedure related to the first control signaling is the PDU session release procedure, the second control signaling may be a PDU session release request. Alternatively, if the procedure related to the first control signaling is the PDU session modification procedure, the second control signaling may be a PDU session modification request. In another example, that the first control signaling is triggered by the control plane may include that the first control signaling is triggered by the SMF network element. For example, when the first control signaling is N1N2 message transfer signaling, if the procedure related to the first control signaling is the service continuity and user plane function management procedure, for example, a procedure for a change of a PDU session anchor in a multiple-PDU-session scenario, the first control signaling is triggered when the SMF network element decides that the UPF network element or the SMF network element needs to perform relocation. For a specific implementation in which the SMF network element decides that the UPF network element or the SMF network element needs to perform relocation, refer to the other approaches. Details are not described herein.

In an example, that the first control signaling is triggered by the user plane may include that the first control signaling is triggered by a downlink data packet.

Figure 5B:
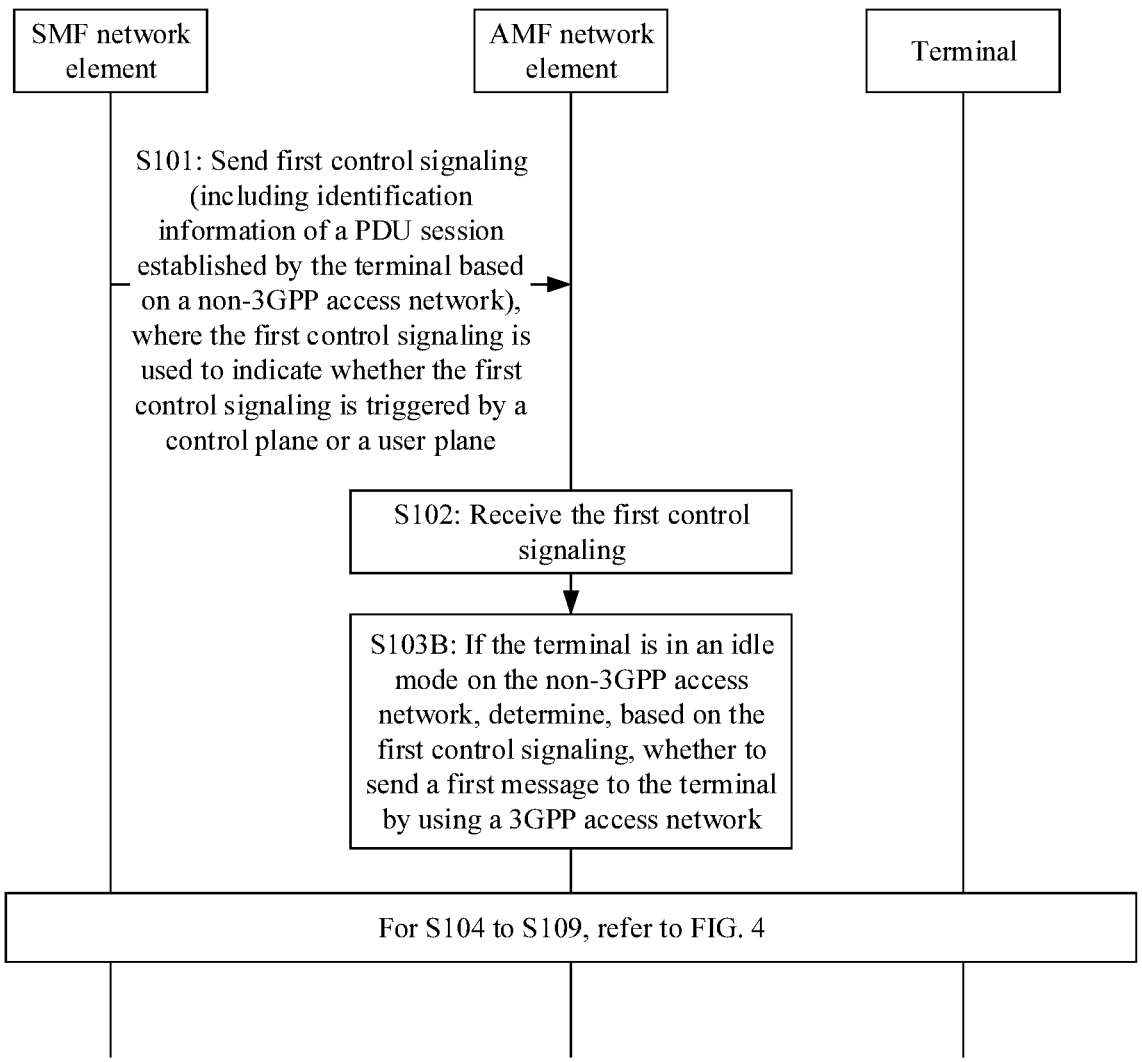
FIG. 5B is a schematic interaction diagram of a signaling processing method according to an embodiment of this application.

Based on the manner 1B, as shown in FIG. 5B, S103 may include S103B.

S103B: If the terminal is in an idle mode on the non-3GPP access network, the AMF network element determines, based on the first control signaling, whether to send the first message to the terminal using the 3GPP access network. Further, the AMF network element may identify, based on the indication of the SMF network element, whether the first control signaling is triggered by the control plane or the user plane, and may use an identification result as a reference to determine whether to send the first message to the terminal using the 3GPP access network.

Optionally, that the first control signaling is used to indicate whether the first control signaling is triggered by a control plane or a user plane includes one of the following cases.

Case 1B-1: The first control signaling further includes fourth indication information, where the fourth indication information is used to indicate whether the first control signaling is triggered by the control plane or the user plane.

Further, the first control signaling may carry fourth indication information having different content, to indicate whether first control signaling is triggered by the control plane or the user plane. For example, a binary digit "1" may be carried to indicate that the first control signaling is triggered by the control plane, and a binary digit "0" may be carried to indicate that the first control signaling is triggered by the user plane. Certainly, this application is not limited thereto.

Based on the case 1B-1, optionally, S103B may include, if the terminal is in an idle mode on the non-3GPP access network, when the fourth indication information included in the first control signaling is used to indicate that the first control signaling is triggered by the control plane, the AMF network element may determine not to send the first message to the terminal using the 3GPP access network, or when the fourth indication information included in the first control signaling is used to indicate that the first control signaling is triggered by the user plane, the AMF network element may determine to send the first message to the terminal using the 3GPP access network. Certainly, this application is not limited thereto.

Case 1B-2: The first control signaling further includes or does not include fifth indication information, where the fifth indication information is used to indicate that the first control signaling is triggered by the control plane, and if the first control signaling does not include the fifth indication information, the first control signaling is used to indicate that the first control signaling is triggered by the user plane.

For example, the fifth indication information may be a paging priority indication. It can be understood that, usually, if the first control signaling is triggered by the user plane, the first control signaling includes the paging priority indication, or if the first control signaling is triggered by the control plane, the first control signaling does not include the paging priority indication. Therefore, the AMF network element may determine, based on whether the first control signaling includes the paging priority indication, whether the first control signaling is triggered by the user plane or the control plane.

Based on the case 1B-2, optionally, S103B may include, if the terminal is in an idle mode on the non-3GPP access network, when the first control signaling includes the fifth indication information, the AMF network element determines that the first control signaling is triggered by the control plane, and in this case, the AMF network element may determine not to send the first message to the terminal using the 3GPP access network, or when the first control signaling does not include the fifth indication information, the AMF network element determines that the first control signaling is triggered by the user plane, and in this case, the AMF network element may determine to send the first message to the terminal using the 3GPP access network. Certainly, this application is not limited thereto. It can be learnt that, this embodiment of this application is compatible with the following existing solution. If the first control signaling is triggered by a downlink data packet, when the terminal is in an idle mode on the non-3GPP access network, the terminal is paged using the 3GPP access network.

Case 1B-3: The first control signaling further includes or does not include sixth indication information, where the sixth indication information is used to indicate that the first control signaling is triggered by the user plane, and if the first control signaling does not include the sixth indication information, the first control signaling is used to indicate that the first control signaling is triggered by the control plane.

Based on the case 1B-3, optionally, S103B may include, if the terminal is in an idle mode on the non-3GPP access network, when the first control signaling includes the sixth indication information, the AMF network element determines that the first control signaling is triggered by the user plane, and in this case, the AMF network element may determine to send the first message to the terminal using the 3GPP access network, or when the first control signaling does not include the sixth indication information, the AMF network element determines that the first control signaling is triggered by the control plane, and in this case, the AMF network element may determine not to send the first message to the terminal using the 3GPP access network. Certainly, this application is not limited thereto. It can be learnt that, this embodiment of this application is compatible with the following existing solution. If the first control signaling is triggered by a downlink data packet, when the terminal is in an idle mode on the non-3GPP access network, the paging message is sent to the terminal using the 3GPP access network.

It can be understood that based on the manner 1B, the SMF network element and the AMF network element can pre-agree specific indication information (which may be the fourth indication information, the fifth indication information, or the sixth indication information) in the first control signaling that is used to indicate (explicitly indicate or implicitly indicate) whether the first control signaling is triggered by the control plane or the user plane. That is, the SMF network element and the AMF network element pre-agree a specific case for indicating whether the first control signaling is triggered by the control plane or the user plane.

It can be understood that, that "if the first control signaling indicates that the first control signaling is triggered by the control plane, the AMF network element determines not to send the first message to the terminal using the 3GPP access network, or if the first control signaling indicates that the first control signaling is triggered by the user plane, the AMF network element determines to send the first message to the terminal using the 3GPP access network" is used as an example for description in all the optional implementations in the three cases of the manner 1B. Alternatively, the following example may be used. If the first control signaling indicates that the first control signaling is triggered by the control plane, the AMF network element determines to send the first message to the terminal using the 3GPP access network, or if the first control signaling indicates that the first control signaling is triggered by the user plane, the AMF network element determines not to send the first message to the terminal using the 3GPP access network. Further, whether the first message is sent to the terminal using the 3GPP access network may be determined depending on an actual requirement such as a deployment policy of an operator or a load status of the AMF network element.

It can be understood that, that "the indication of the SMF network element means that the SMF network element uses the first control signaling to indicate whether the first control signaling is triggered by the control plane or the user plane" is used as an example for description in all the foregoing cases of the manner 1B. In addition, control signaling different from the first control signaling may alternatively be used for indication. Further, the control signaling may be used to indicate whether the first control signaling is triggered by the control plane or the user plane, or whether the control signaling is sent may be used to indicate whether the first control signaling is triggered by the control plane or the user plane.

It should be noted that any indication information in the first indication information to the sixth indication information may be indication information that is newly designed for implementing a corresponding technical solution provided in this embodiment of this application, or may be indication information that is obtained with reference to or using other approaches indication information. For example, the third indication information may be a new skip indication that is designed with reference to a "skip indication" in an existing mechanism. For another example, the fifth indication information may be indication information that is obtained using the paging priority indication. That is, the paging priority indication is used to implicitly indicate information indicated by the fifth indication information.

Manner 1C: The first control signaling is used to indicate the procedure related to the first control signaling. That is, in this manner, the AMF network element may determine, based on a granularity of the procedure related to the first control signaling, whether to send the first message to the terminal using the 3GPP access network. For example, the procedure related to the first control signaling may include any one of the following procedures: a PDU session release procedure, a PDU session modification procedure, and a session and service continuity and user plane function management procedure. Further, the first control signaling further includes seventh indication information, and the seventh indication information is used to indicate the procedure related to the first control signaling.

Figure 5C:
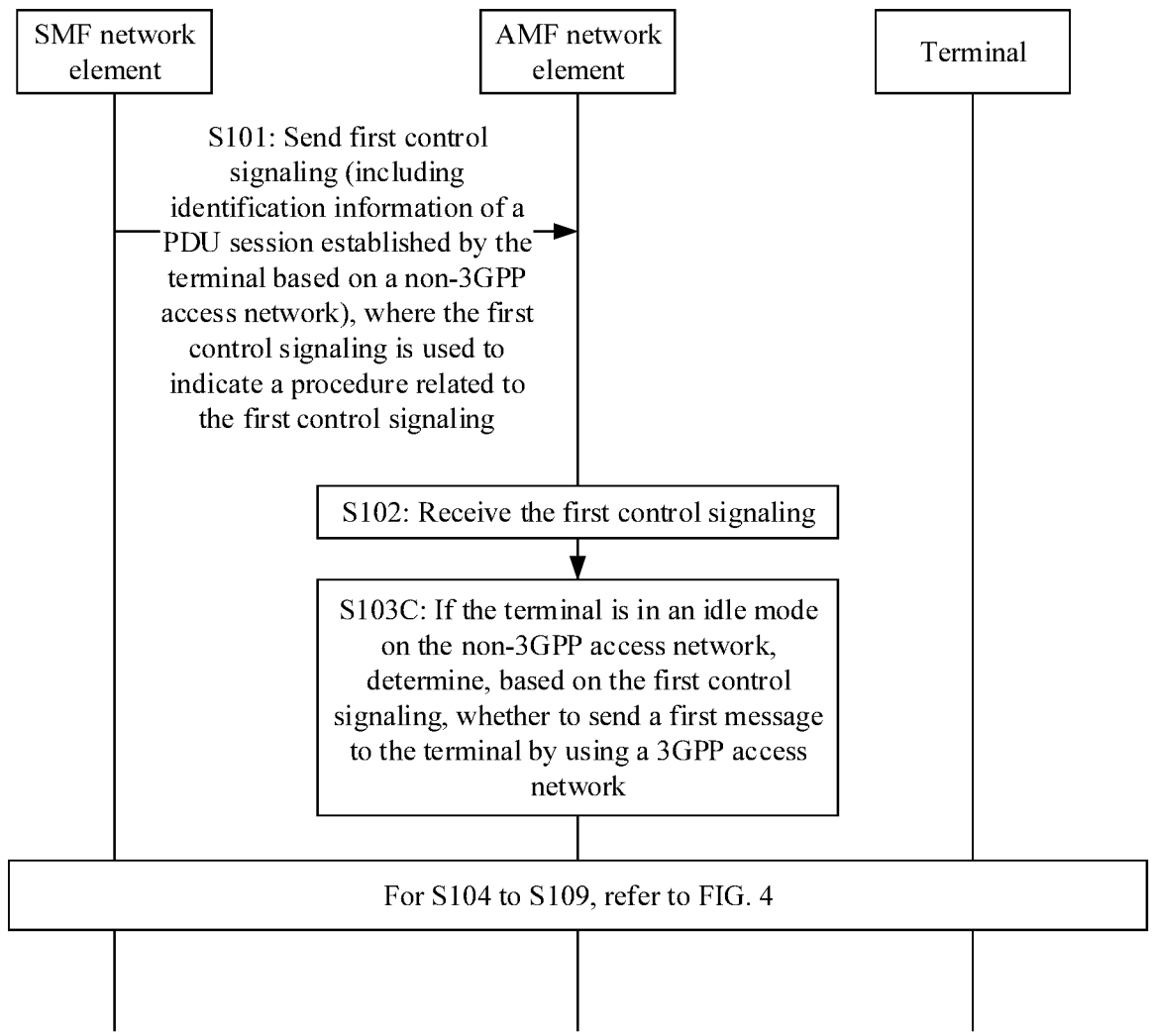
FIG. 5C is a schematic interaction diagram of a signaling processing method according to an embodiment of this application.

In this case, as shown in FIG. 5C, S103 may include S103C.

S103C: If the terminal is in an idle mode on the non-3GPP access network, the AMF network element determines, based on the first control signaling (which is the seventh indication information in the first control signaling), whether to send the first message to the terminal using the 3GPP access network. Further, the AMF network element may identify the procedure related to the first control signaling based on the indication of the SMF network element, and may use an identification result as a reference to determine whether to send the first message to the terminal using the 3GPP access network.

In principle, regardless of the procedure related to the first control signaling, the AMF network element may determine whether to send the first message to the terminal using the 3GPP access network element. For example, the AMF network element may further perform determining based on information such as a deployment policy of an operator.

Figure 5D:
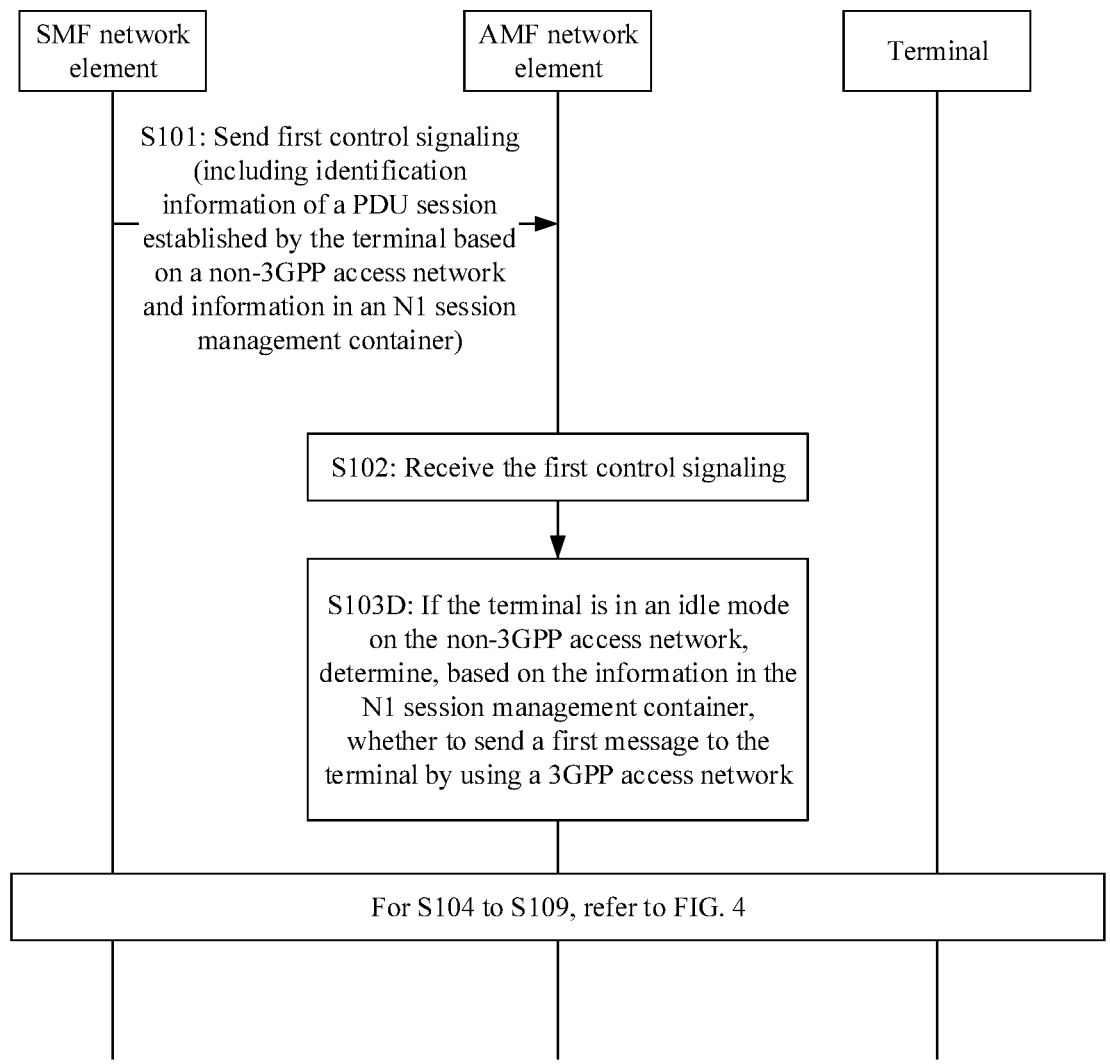
FIG. 5D is a schematic interaction diagram of a signaling processing method according to an embodiment of this application.

Manner 2: The first control signaling further includes information in an N1 session management container. In this case, as shown in FIG. 5D, S103 may include S103D.

S103D: If the terminal is in an idle mode on the non-3GPP access network, the AMF network element determines, based on the information in the N1 session management container, whether to send the first message to the terminal using the 3GPP access network. That is, the AMF network element may determine, with reference to the information in the N1 session management container included in the first control signaling, whether to send the first message to the terminal using the 3GPP access network. In this case, the AMF network element needs to parse the information included in the N1 session management container.

It can be learnt that in the manner 2, the AMF network element may identify, by parsing the information included in the N1 session management container, the procedure related to the first control signaling, and may use an identification result as a reference to determine whether to send the first message to the terminal using the 3GPP access network.

The N1 session management container is generated by the SMF network element and sent to the terminal. At present, usually the AMF network element transparently transmits, to the terminal, the N1 session management container received from the SMF network element. That is, the AMF network element does not parse the information included in the N1 session management container, and the terminal parses the information included in the N1 session management container instead. In the technical solution proposed in this embodiment of this application, the AMF network element is supported to parse the information included in the N1 session management container. For a method for parsing the information included in the N1 session management container by the AMF network element, refer to a method that is for parsing the information included in the N1 session management container by the terminal and that is provided in the other approaches. Details are not described herein.

It can be understood that the AMF network element can learn, by parsing the information included in the N1 session management container, a specific procedure related to the first control signaling (for example, a PDU session release procedure, a PDU session modification procedure, or a session and service continuity and user plane function management procedure), and may determine, based on the procedure related to the first control signaling, whether to send the first message to the terminal using the 3GPP access network. For details, refer to the foregoing description. Details are not described herein again.

Figure 5E:
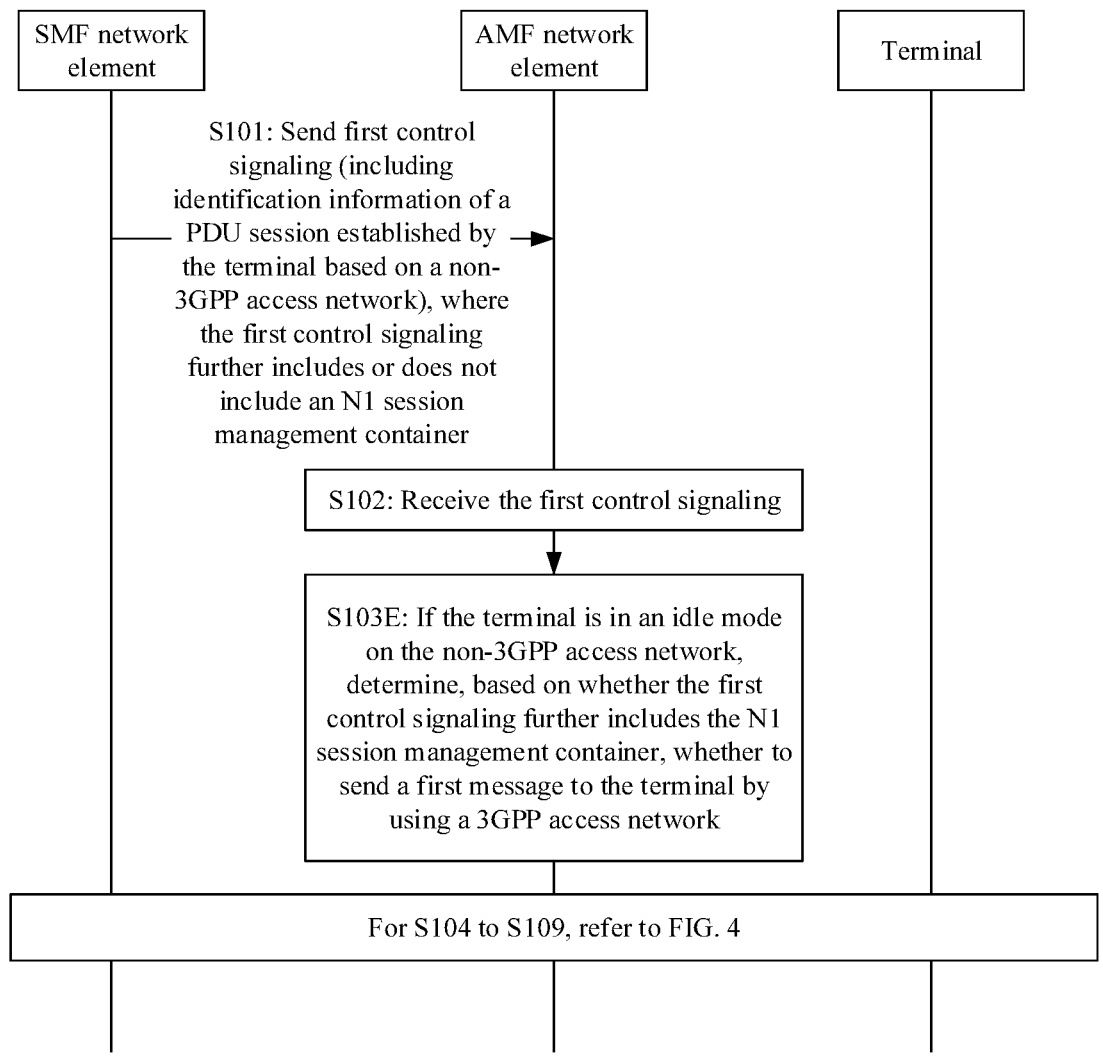
FIG. 5E is a schematic interaction diagram of a signaling processing method according to an embodiment of this application.

Manner 3: The first control signaling further includes an N1 session management container or does not include an N1 session management container. In this case, as shown in FIG. 5E, S103 may include S103E.

S103E: If the terminal is in an idle mode on the non-3GPP access network, the AMF network element determines, based on whether the first control signaling further includes the N1 session management container, whether to send the first message to the terminal using the 3GPP access network. That is, the AMF network element may determine, with reference to the first control signaling to determine whether the first control signaling includes the N1 session management container, whether to send the first message to the terminal using the 3GPP access network. In this case, the AMF network element may not parse information included in the N1 session management container.

It can be understood that if the first control signaling is triggered by the control plane, the first control signaling includes the N1 session management container. For a related description of the N1 session management container, refer to the foregoing description or the other approaches. If the first control signaling is triggered by the user plane, the first control signaling does not include the N1 session management container. Therefore, the AMF network element may identify, based on whether the first control signaling includes the N1 session management container, whether the first control signaling is triggered by the control plane or the user plane, and may determine, based on whether the first control signaling is triggered by the control plane or the user plane, whether to send the first message to the terminal using the 3 GPP access network. For details, refer to the foregoing description. Details are not described herein again.

Manner 4: The first control signaling may further include other information, or the first control signaling may include or not include other information. The other information is information that is other than the N1 session management container and the first indication information to the seventh indication information and that may be used to indicate (explicitly indicate or implicitly indicate) whether the first control signaling is triggered by the user plane or the control plane. For example, the other information may be user plane information included in N2 information in the first control signaling. The AMF network element may determine, based on the user plane information included in the first control signaling or whether the first control signaling includes the user plane information, whether the first control signaling is triggered by the user plane or the control plane. For a specific implementation process, refer to the other approaches. Details are not described herein. Subsequently, the AMF network element may determine, based on whether the first control signaling is triggered by the control plane or the user plane, whether to send the first message to the terminal using the 3GPP access network. For details, refer to the foregoing description. Details are not described herein again.

The foregoing describes a case in which when the AMF network element receives the first control signaling sent by the SMF network element, if the terminal is in an idle mode on the non-3GPP access network, the AMF network element determines whether to send the first message to the terminal using the 3GPP access network. In addition, an embodiment of this application further provides the following technical solutions.

Figure 6:
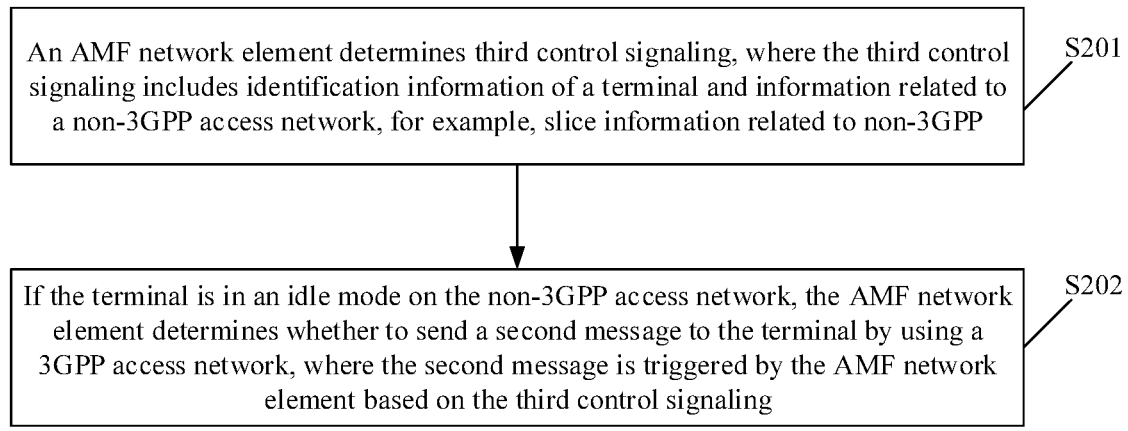
FIG. 6 is a schematic interaction diagram of a signaling processing method according to an embodiment of this application.

FIG. 6 is a schematic flowchart of another signaling processing method according to an embodiment of this application. The method shown in FIG. 6 may include the following steps.

S201: An AMF network element determines third control signaling, where the third control signaling includes identification information of a terminal and information related to a non-3GPP access network, for example, slice information related to non-3GPP.

Optionally, the third control signaling may include a UE configuration update message or signaling related to a PDU session release procedure triggered by the AMF network element such as downlink NAS transport signaling. A specific case for determining a manner of the third control signaling by the AMF network element is not limited in this embodiment of this application. For example, for details, refer to the other approaches.

S202: If the terminal is in an idle mode on the non-3GPP access network, the AMF network element determines, based on the information related to the non-3GPP access network included in the third control signaling, whether to send a second message to the terminal using a 3GPP access network, where the second message is triggered by the AMF network element based on the third control signaling.

The AMF network element may determine, based on content in the message sent to the terminal, whether to send a notification message to the terminal. For example, if the information related to the non-3GPP access network included in the third control signaling is the slice information related to non-3GPP, the AMF network element determines to send the second message to the terminal using the 3GPP access network. For example, the AMF network element may alternatively determine whether to send the second message to the terminal using the 3GPP access network, depending on an actual requirement such as policy information of an operator or a load status of the AMF network element. The second message may be the same as or different from the first message. For a related description of the first message, refer to the foregoing description only when there is no conflict. Details are not described herein again.

It can be learnt from FIG. 6 and the foregoing description that, this embodiment of this application provides a specific implementation solution performed when the AMF network element determines that control signaling (that is, the third control signaling) needs to be sent to the terminal. Further, the AMF network element may determine whether to send the first message to the terminal using the 3GPP access network. In this way, on one hand, if a message is sent to the terminal using the 3GPP access network, the terminal can obtain related information in time, thereby improving user experience. On the other hand, if a message is not sent to the terminal using the 3GPP access network, paging signaling overheads can be reduced.

Figure 11:
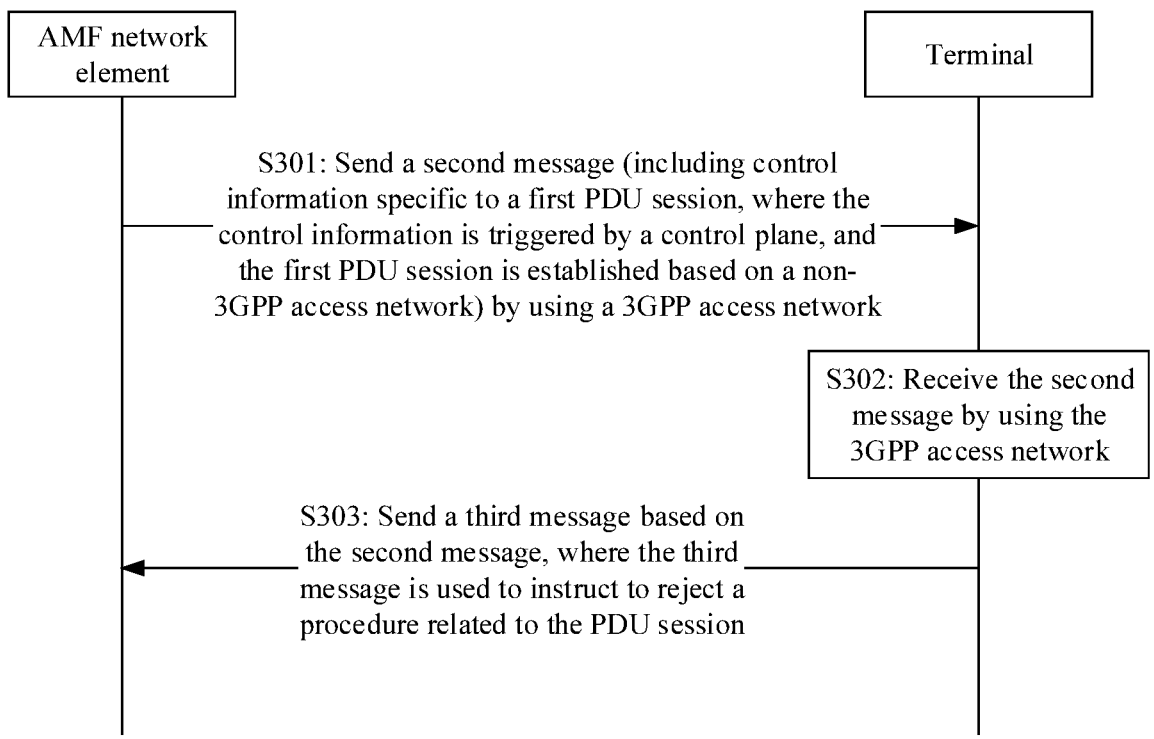
FIG. 11 is a schematic interaction diagram of a message processing method according to an embodiment of this application.

FIG. 11 is a schematic interaction diagram of a message processing method according to an embodiment of this application. The method shown in FIG. 11 may include the following steps.

S301: An AMF network element sends a second message to a terminal using a 3GPP access network. The second message includes control information specific to a first PDU session. The control information is triggered by a control plane, and the first PDU session is a PDU session established based on a non-3GPP access network. The first PDU session may be any PDU session established by the terminal based on the non-3GPP access network. For example, the first PDU session may be the PDU session 2 in FIG. 2.

Optionally, the control information may include any one of the following: a modification command specific to the first PDU session, a release command specific to the first PDU session, an authorization/authentication command specific to the first PDU session, and the like. The modification command specific to the first PDU session is used to instruct to modify the first PDU session, the release command specific to the first PDU session is used to instruct to release the first PDU session, and the authorization/authentication command specific to the first PDU session is used to instruct to perform authorization/authentication on the first PDU session.

A specific implementation in which the second message includes the control information specific to the first PDU session is not limited in this embodiment of this application. For example, the second message may include the control information and identification information of the first PDU session. For another example, the second message may include the control information, and the control information carries identification information of the first PDU session and the like.

Optionally, the second message may be a NAS message. In this case, the control information specific to the first PDU session may be included in an N1 session management container in the NAS message. If the AMF network element determines that the NAS message carries the N1 session management container, it indicates that the control information specific to the first PDU session included in the second message is triggered by the control plane.

That the control information specific to the first PDU session is triggered by the control plane may include that the control information specific to the first PDU session is triggered by other control signaling. For example, if the control information specific to the first PDU session is the modification command specific to the first PDU session, the other control signaling may be a PDU session modification request. For example, if the control information specific to the first PDU session is the release command specific to the first PDU session, the other control signaling may be a PDU session release request. For example, if the control information specific to the first PDU session is the authorization/authentication command specific to the first PDU session, the other control signaling may be a PDU session authorization/authentication request.

S302: The terminal receives, using the 3GPP access network, the second message sent by the AMF network element.

S303: The terminal sends a third message to the AMF network element based on the second message, where the third message is used to instruct to reject a procedure related to the PDU session.

Optionally, if the control information specific to the first PDU session includes the modification command specific to the first PDU session, the third message is used to instruct to reject a modification procedure specific to the first PDU session, that is, reject modification of the first PDU session. In an example, the PDU session modification procedure may include the following. Because of quality of service (QoS) information update of the PDU session and other reasons, a network side network element (such as an SMF network element) decides to initiate the PDU session modification procedure. For example, the SMF network element sends a message to the AMF network element in order to instruct the AMF network element to send information related to the QoS information update to an access network device and/or the terminal, and the SMF network element initiates a session management policy-related modification procedure to a PCF network element. This procedure can be completed through information exchange between network elements, such as the SMF network element, the PCF network element, the AMF network element, the access network device, and the terminal. For details, refer to the other approaches. Rejecting the modification procedure specific to the first PDU session can be understood as follows. After receiving the control information specific to the first PDU session, the terminal does not continue performing a subsequent step of the modification procedure specific to the first PDU session. It should be noted that specific implementation steps of PDU session modification procedures vary with different triggering reasons for the PDU session modification procedures. The specific implementation steps are not limited in this embodiment of this application.

Optionally, if the control information specific to the first PDU session includes the release command specific to the first PDU session, the third message is used to instruct to reject initiation of an establishment procedure specific to a second PDU session after the first PDU session is released, that is, reject establishment of the second PDU session performed using the 3GPP access network. The second PDU session has a same DNN attribute as the first PDU session. In an example, the PDU session establishment procedure may include the following. The terminal sends a request for establishing a PDU session to the AMF network element, and a data transmission path for the PDU session is completed. This procedure can be completed through information exchange between network elements, such as the SMF network element, the AMF network element, the access network device, and the terminal. For details, refer to the other approaches. This is merely an example. Specific implementation steps of PDU session establishment procedures vary with different capabilities of the terminal and the network side network element and different policy information. Rejecting initiation of the establishment procedure specific to the second PDU session can be understood as rejecting sending of an establishment request specific to the second PDU session to the AMF network element. Accordingly, the terminal does not continue performing a subsequent step of the establishment procedure specific to the second PDU session.

Specific information included in the third message that is used to instruct to reject the procedure related to the PDU session is not limited in this embodiment of this application. Optionally, the third message may further include a cause value, and the cause value is used to indicate a reason for rejecting the procedure related to the PDU session. For example, the cause value may be information used to indicate that an access technology type of the first PDU session is a non-3GPP access technology.

In this embodiment, a processing solution performed by the terminal in a scenario in which the AMF network element sends, using the 3GPP access network, a message including the control information specific to the PDU session that is established based on the non-3GPP access network describes rejection of the procedure related to the PDU session. The solution is proposed in consideration of a scenario in which the terminal receives, using an access technology type (which is a 3GPP access technology), control information specific to another access technology type (which is the non-3GPP access technology), and the control information cannot be normally used for a PDU session established based on the other access technology type (which is the non-3GPP access technology).

Figure 12A:
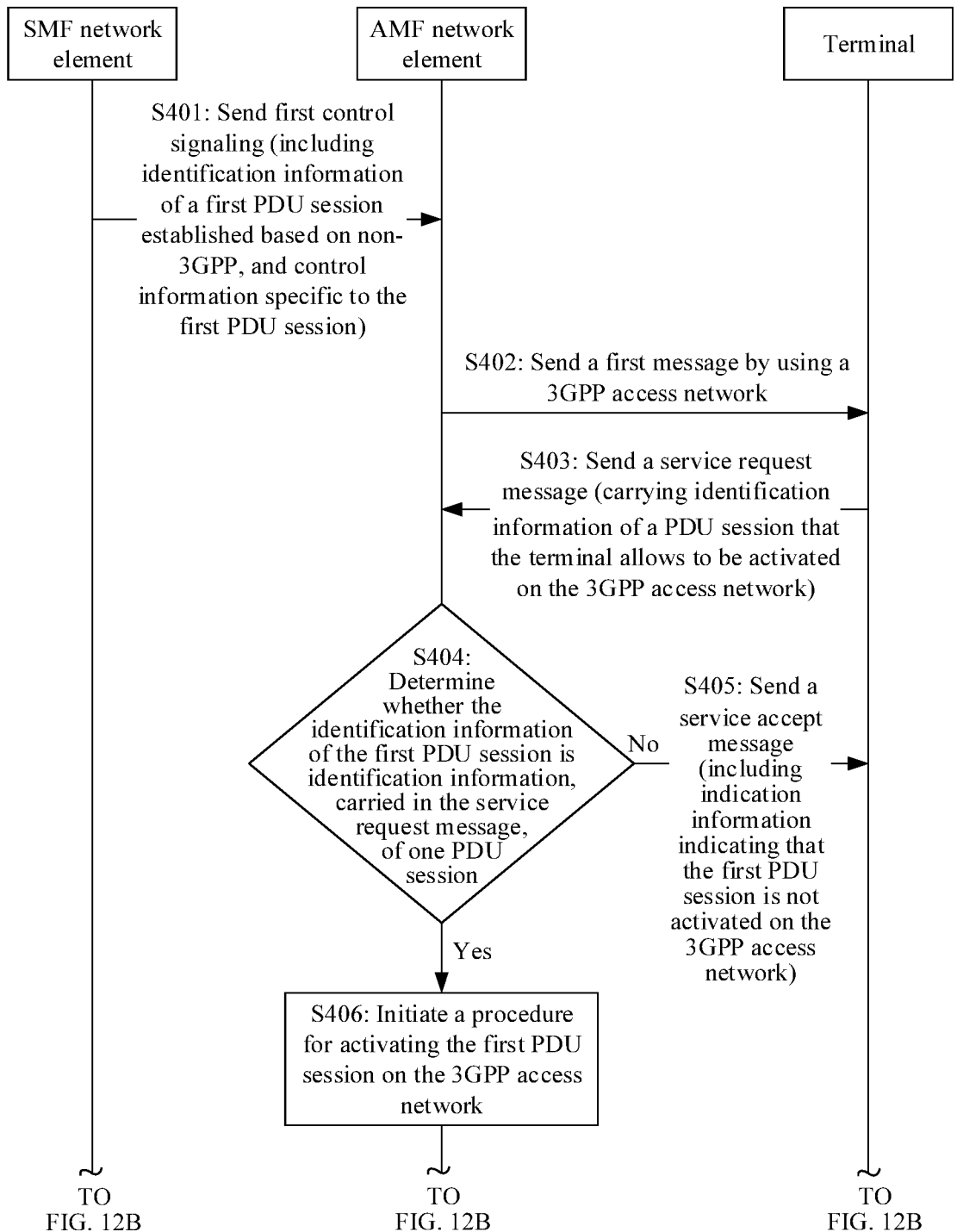
FIG. 12A and FIG. 12B are a schematic interaction diagram of a message processing method according to an embodiment of this application.
Figure 12B:
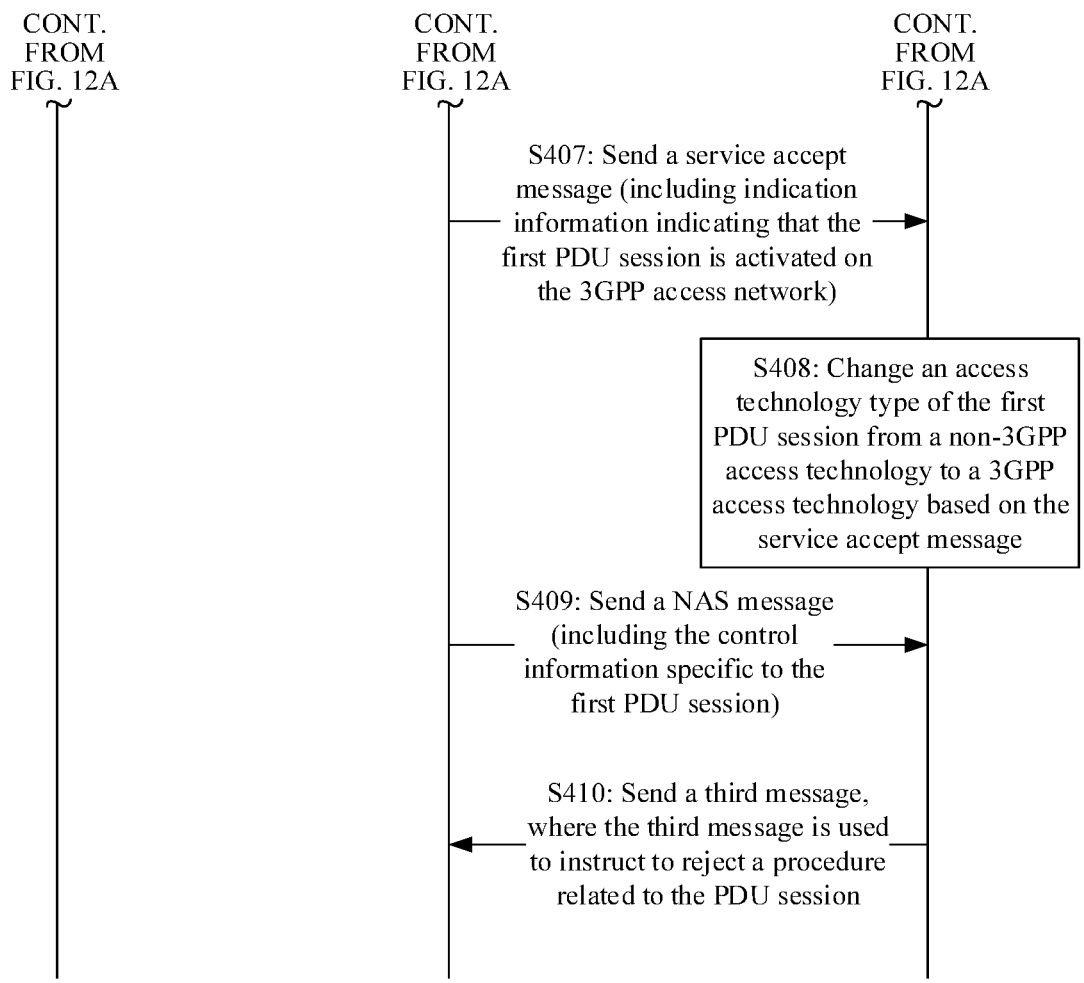

FIG. 12A and FIG. 12B are a schematic interaction diagram of a message processing method according to an embodiment of this application. The method may be an example of the message processing method shown in FIG. 11. The method shown in FIG. 12A and FIG. 12B may include the following steps.

S401: An SMF network element sends first control signaling to an AMF network element. The first control signaling includes identification information of a first PDU session of a terminal and control information specific to the first PDU session. For example, the first PDU session may be the first PDU session in the embodiment shown in FIG. 11.

For example, the first control signaling may be a Namf_Communication_N1N2MessageTransfer message. The message may carry an N1 session management container and the identification information of the first PDU session. The N1 session management container carries the control information specific to the first PDU session, for example, a PDU session release command, a PDU session modification command, or an authorization/authentication command.

S402: After the AMF network element receives the first control signaling, if the terminal is in an idle mode on a non-3GPP access network, the AMF network element sends a first message to the terminal using a 3GPP access network.

The first message is triggered by the AMF network element based on the first control signaling. For example, if the terminal is in an idle mode on the 3GPP access network, the first message may include a paging message. For another example, if the terminal is in a connected mode on the 3GPP access network, the first message may include a notification message. For other related descriptions of the first message, refer to the foregoing description. Details are not described herein again.

S403: After receiving the first message, the terminal sends a service request message to the AMF network element. The service request message is used to request activation of a user plane resource of a PDU session or signaling connection establishment. The service request message may include identification information of one or more PDU sessions. The PDU session indicated by the identification information of the one or more PDU sessions is a PDU session determined by the terminal that is established based on the non-3GPP access network and that is allowed or desired to be activated on the 3GPP access network. The identification information of the one or more PDU sessions may be carried in the service request message in a form of a list.

S404: After receiving the service request message from the terminal, the AMF network element determines whether the identification information of the first PDU session is identification information, carried in the service request message, of one PDU session.

If the identification information of the first PDU session is not identification information, carried in the service request message, of one PDU session, it indicates that the first PDU session is not allowed or not desired, by the terminal, to be activated on the 3GPP access network, and therefore S405 is performed.

If the identification information of the first PDU session is identification information, carried in the service request message, of one PDU session, it indicates that the first PDU session is allowed or desired, by the terminal, to be activated on the 3GPP access network, and therefore S406 is performed.

S405: The AMF network element sends a service accept message to the terminal, where the service accept message includes indication information indicating that the first PDU session is not activated on the 3GPP access network. S409 is performed after S405.

S406: The AMF network element initiates a procedure for activating the first PDU session on the 3GPP access network.

The procedure for activating the first PDU session is a procedure for establishing a user plane resource of the first PDU session based on the 3GPP access network, and may be implemented through information exchange between network elements, such as the AMF network element and the SMF network element. For a specific implementation process, refer to the other approaches. Details are not described herein.

It should be noted that after the first PDU session established based on the non-3GPP access network is activated on the 3GPP access network, the identification information of the first PDU session and the like are unchanged, and an access technology type of the first PDU session is changed from a non-3GPP access technology to a 3GPP access technology.

S407: After the procedure for activating the first PDU session ends, the AMF network element sends a service accept message to the terminal, where the service accept message includes indication information indicating that the first PDU session is activated on the 3GPP access network.

In this embodiment of this application, the indication information indicating whether the first PDU session is activated on the 3GPP access network is added to the service accept request, and then the service accept request is sent by the AMF network element to the terminal. Certainly, this application is not limited thereto.

A specific implementation form of the indication information indicating that the first PDU session is activated on the 3GPP access network is not limited in this embodiment of this application. For example, the indication information may be information directly indicating (or explicitly indicating) that the first PDU session is activated on the 3GPP access network, or may be information indirectly indicating (or implicitly indicating) that the first PDU session is activated on the 3GPP access network.

S408: The terminal changes the access technology type of the first PDU session from the non-3GPP access technology to the 3GPP access technology based on the service accept message.

S409: The AMF network element sends a NAS message to the terminal using the 3GPP access network. For example, after receiving the first control signaling, the AMF network element sends the NAS message to the terminal using the 3GPP access network. The NAS message includes the control information specific to the first PDU session. For example, the control information specific to the first PDU session is carried in the N1 session management container in the NAS message.

The NAS message may be understood as a specific implementation of the second message in the embodiment shown in FIG. 11.

An execution sequence of S402 to S408 and S409 is not limited in this embodiment of this application. For example, S402 to S408 may be performed before S409, S409 may be performed before S402 to S408, or S409 may be performed in a process of performing S402 to S408. That S402 to S408 are performed before S409 is used as an example for description in FIG. 12A and FIG. 12B. It can be understood that if S409 is performed before S405 (for example, in a scenario in which S409 is performed before S402 to S408), S410 may directly be performed after S405.

S410: After receiving the NAS message and the service accept message, the terminal sends a third message to the AMF network element, where the third message is used to instruct to reject a procedure related to the PDU session, and the third message may include the identification information of the first PDU session.

Optionally, if the control information specific to the first PDU session included in the NAS message is a modification command specific to the first PDU session, and the service accept message includes the indication information indicating that the first PDU session is activated on the 3GPP access network, the terminal rejects a modification procedure specific to the first PDU session. This is because the modification command specific to the first PDU session is a command used to modify the first PDU session whose access technology type is the non-3GPP access technology type, but after the first PDU session is activated on the 3GPP access network, the access technology type of the first PDU session is the 3GPP access technology type. In this case, information used to trigger the modification command specific to the first PDU session such as QoS information is inapplicable to the first PDU session whose access technology type is a current access technology (that is, the 3GPP access technology). Therefore, the modification procedure specific to the first PDU session may not be performed.

Optionally, if the control information specific to the first PDU session included in the NAS message is a release procedure specific to the first PDU session, and it is determined, based on the information in the service accept message, that the first PDU session is not activated on the 3GPP access network, the terminal releases the first PDU session and rejects initiation of an establishment procedure specific to a second PDU session. This is because the first PDU session is not activated on the 3GPP access network, and then the terminal may determine that the second PDU session cannot be established based on the 3GPP access network either, but the terminal is currently in an idle mode on the non-3GPP access network. Consequently, the terminal cannot establish the second PDU session based on the non-3GPP access network and 3GPP access network. In this case, the terminal does not establish the second PDU session. The second PDU session is a PDU session that has a same DNN attribute as the first PDU session.

It can be understood that at present, the terminal records a current access technology type of each PDU session established by the terminal, where the access technology type includes the non-3GPP access technology or the 3GPP access technology. If the access technology type of the PDU session is changed, the terminal changes the recorded current access technology type of the PDU session, as shown in S408. In this case, this embodiment of this application provides the following optional implementations, describing how to determine, when the terminal receives the control information, that the control information is applied to the PDU session established based on the non-3GPP access network in order to determine whether to send the third message to the AMF network element.

Manner 1: After S408, the terminal further records information indicating that the access technology type of the first PDU session is changed. Based on the manner 1, S410 may include that the terminal determines, based on the NAS message, the service accept message, and the recorded information indicating that the access technology type of the first PDU session is changed, to send the third message to the AMF network element.

For example, the terminal may indicate, using the recorded access technology type of the established PDU session that is before the change, that the access technology type of the PDU session is changed. For example, a flag field may be set to indicate that the access technology type of the established PDU session is changed. If a flag field of a PDU session is "1", it indicates that an access technology type of the PDU session is changed. Certainly, this application is not limited thereto.

Optionally, if the terminal receives the NAS message within a preset time period starting from performing S408 (that is, changing the access technology type of the first PDU session from the non-3GPP access technology to the 3GPP access technology), it is considered that the NAS message is applied to the access technology that is before the access technology type is changed. If the terminal receives the NAS message after the preset time period, it is considered that the NAS message is applied to the access technology that is after the access technology type is changed. For example, a timer may be disposed in the terminal, to determine whether the NAS message received by the terminal is an NAS message received within the preset time period.

Based on this optional embodiment, S410 may include that the terminal determines to send the third message to the AMF network element, based on the NAS message (which is the information carried in the NAS message), the service accept message, and that a moment at which the recorded information indicating that the access technology type of the first PDU session is changed and the received NAS message are determined is within the preset time period starting from "changing the access technology type of the first PDU session from the non-3GPP access technology to the 3GPP access technology".

Manner 2: A second message further includes indication information indicating the access technology type, to which the control information is applied, of the PDU session.

In an example, if the second message is a NAS message, the NAS message may include an N1 session management container. The indication information indicating the access technology type, to which the control information is applied, of the PDU session may be carried in the N1 session management container. It can be understood that the AMF network element usually does not parse the information in the N1 session management container, and therefore the information carried in the N1 session management container may be added to the N1 session management container in the first control signaling when the SMF network element generates the first control signaling. That is, the information is sent by the SMF network element to the terminal using the AMF network element.

Figure 13A:
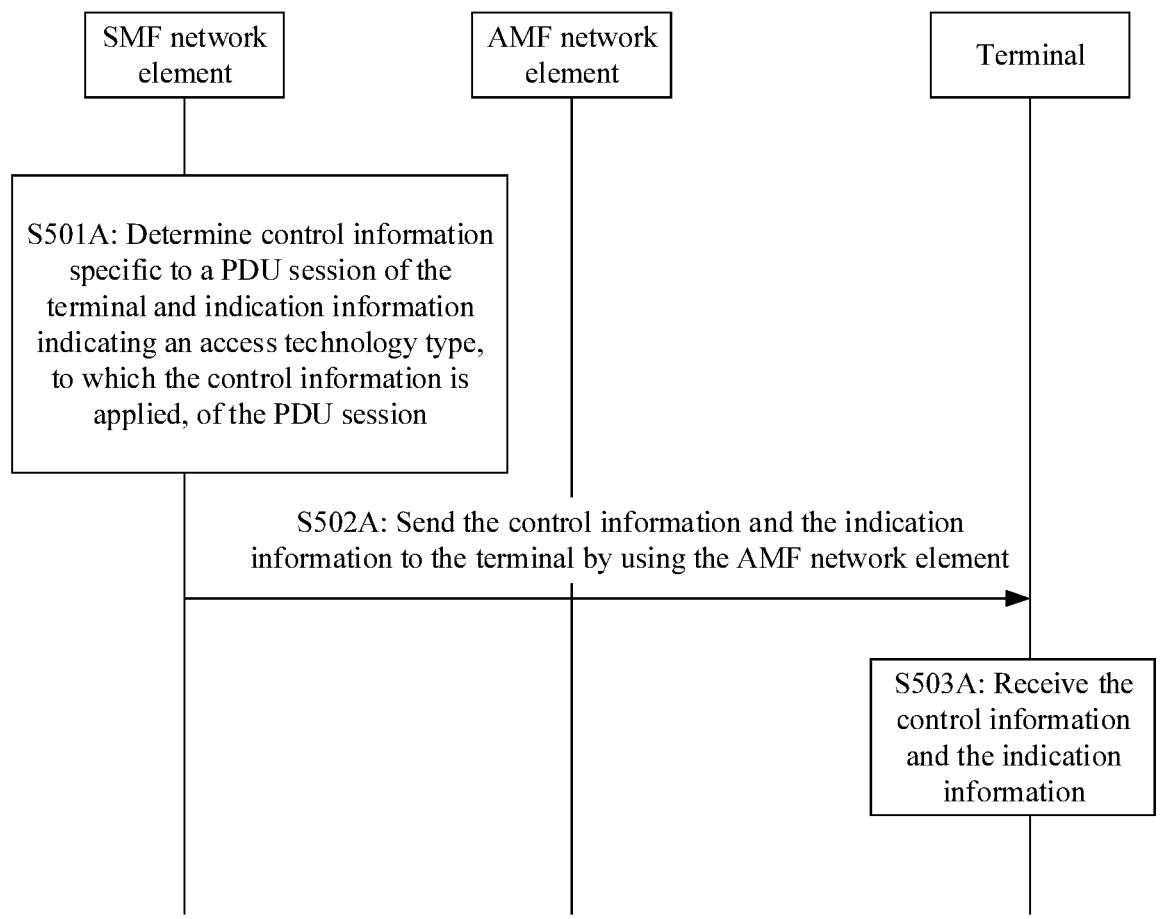
FIG. 13A is a schematic interaction diagram of a message processing method according to an embodiment of this application.

FIG. 13A is a schematic interaction diagram of a message processing method according to an embodiment of this application. The method shown in FIG. 13A may include the following steps.

S501A: An SMF network element determines control information specific to a PDU session of a terminal and indication information indicating an access technology type, to which the control information is applied, of the PDU session. A specific implementation of the access technology type is not limited in this embodiment of this application. For example, the access technology type may be a 3GPP access technology, a non-3GPP access technology, or the like. If the access technology type is the non-3GPP access technology, in an example, the PDU session related to the control information may be the "first PDU session" described in the embodiment shown in FIG. 11 or FIG. 12A and FIG. 12B. In this case, the indication information indicating the access technology type of the first PDU session may be used to indicate that information (such as QoS information) included in the control information is applied to the PDU session corresponding to the non-3GPP access technology.

S502A: The SMF network element sends the control information and the indication information to the terminal using an AMF network element.

For example, the control information and the indication information may be added to an N1 session management container, and then the N1 session management container is sent by the SMF network element to the terminal using the AMF network element. Further, the N1 session management container may be added to the first control signaling described in the embodiment shown in FIG. 12A and FIG. 12B, and then the first control signaling is sent by the SMF network element to the AMF network element, and the N1 session management container may be added to the second message described in the embodiment shown in FIG. 12A and FIG. 12B, and then the second message is sent by the AMF network element to the terminal. This is merely an example, and does not constitute any limitation on a specific implementation of S502. For example, the control information and the indication information may be added to different messages/signaling for sending, or may not be simultaneously sent.

For example, the AMF network element may send the control information and the indication information to the terminal using a 3GPP access network.

S503A: The terminal receives the control information and the indication information.

In the message processing method provided in this embodiment, the SMF network element sends the control information specific to the PDU session of the terminal and the indication information indicating the access technology type of the PDU session to the terminal using the AMF network element. That is, the terminal can learn the access technology type of the PDU session when the network side determines the control information. This helps the terminal determine, when receiving the control information using the 3GPP access network, whether to reject a procedure related to the PDU session. This is merely an application scenario in this embodiment. Certainly, this application is not limited thereto.

Figure 13B:
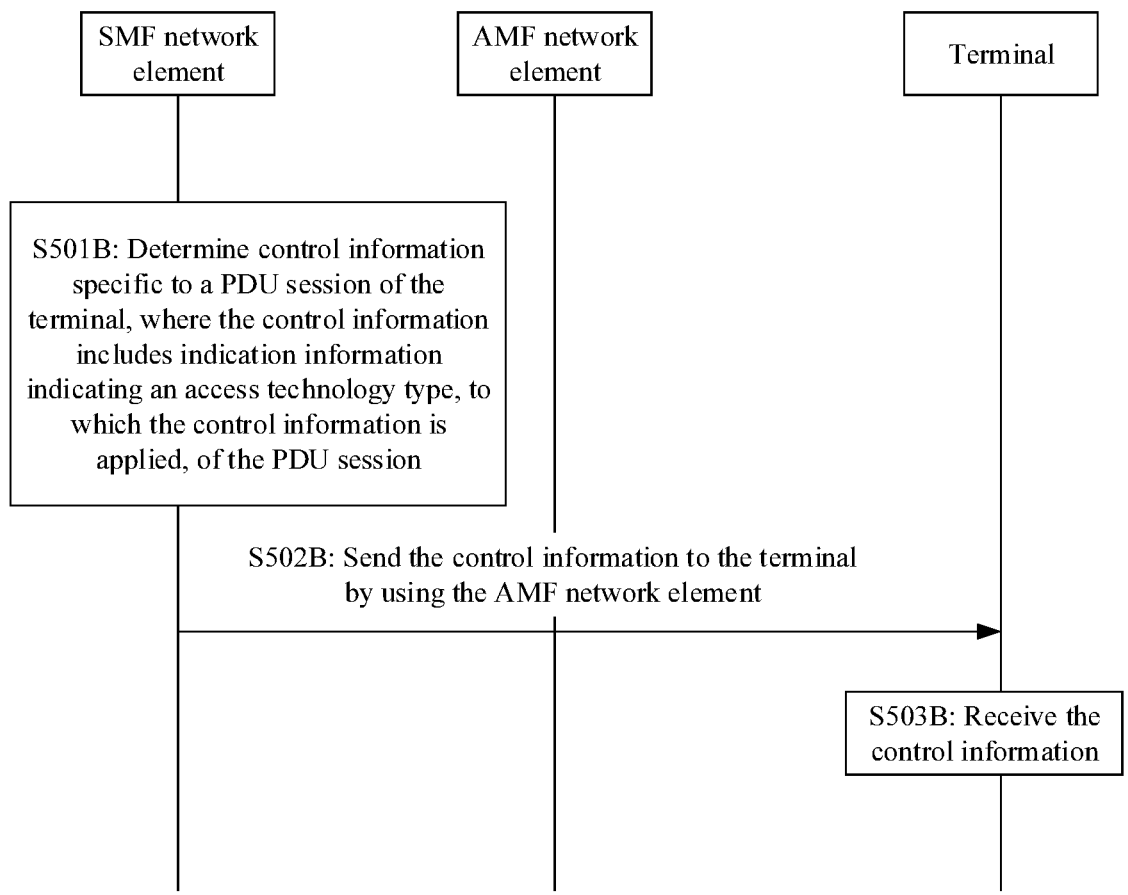
FIG. 13B is a schematic interaction diagram of a message processing method according to an embodiment of this application.

In the embodiment shown in FIG. 13A, that "the control information specific to the PDU session of the terminal" and "the indication information indicating the access technology type, to which the control information is applied, of the PDU session" are two pieces of independent information is used as an example for description. Alternatively, the indication information may be used as a part of the control information. In this case, S501A to S503A may be replaced with S501B to S503B, as shown in FIG. 13B.

S501B: An SMF network element determines control information specific to a PDU session of a terminal, where the control information includes indication information indicating an access technology type, to which the control information is applied, of the PDU session.

S502B: The SMF network element sends the control information to the terminal using an AMF network element.

S503B: The terminal receives the control information.

For an interpretation of related content and beneficial effects in this embodiment, refer to the embodiment shown in FIG. 13A. Details are not described herein again.

Figure 14:
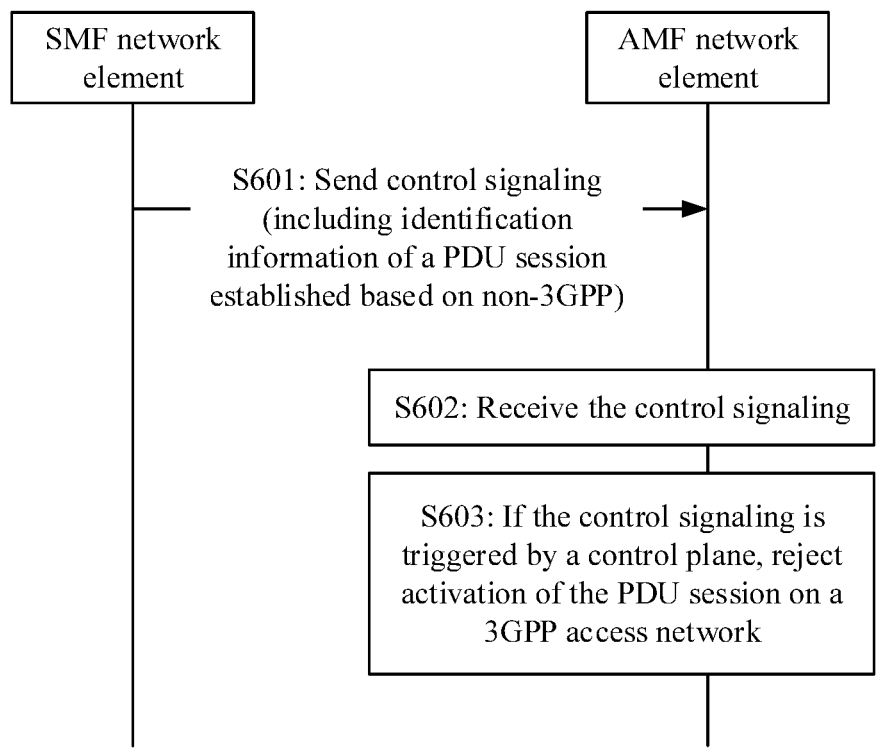
FIG. 14 is a schematic interaction diagram of a message processing method according to an embodiment of this application.

FIG. 14 is a schematic interaction diagram of a message processing method according to an embodiment of this application. The method shown in FIG. 14 includes the following steps.

S601: An SMF network element sends control signaling to an AMF network element. The control signaling includes identification information of a PDU session of a terminal, and the PDU session is a PDU session established based on a non-3GPP access network. For example, the control signaling may be a Namf_Communication_N1N2MessageTransfer message.

S602: The AMF network element receives the control signaling.

S603: If the control signaling is triggered by a control plane, the AMF network element rejects activation of the PDU session on a 3GPP access network. For how the AMF network element determines that the control signaling is triggered by the control plane, refer to the foregoing related description. Details are not described herein again. It can be understood that after performing S602, the AMF network element may further perform another signaling procedure (S702, S703, and the like shown in FIG. 15 in the following), and then perform S603.

In the message processing method provided in this embodiment, when the AMF network element determines that the control signaling carrying the identification information of the PDU session established based on the 3GPP access network is received and that the control signaling is triggered by the control plane, the AMF network element rejects activation of the PDU session on the 3GPP access network. This helps avoid incorrect processing performed on the control signaling caused by a change of an access technology type of the PDU session.

Figure 15:
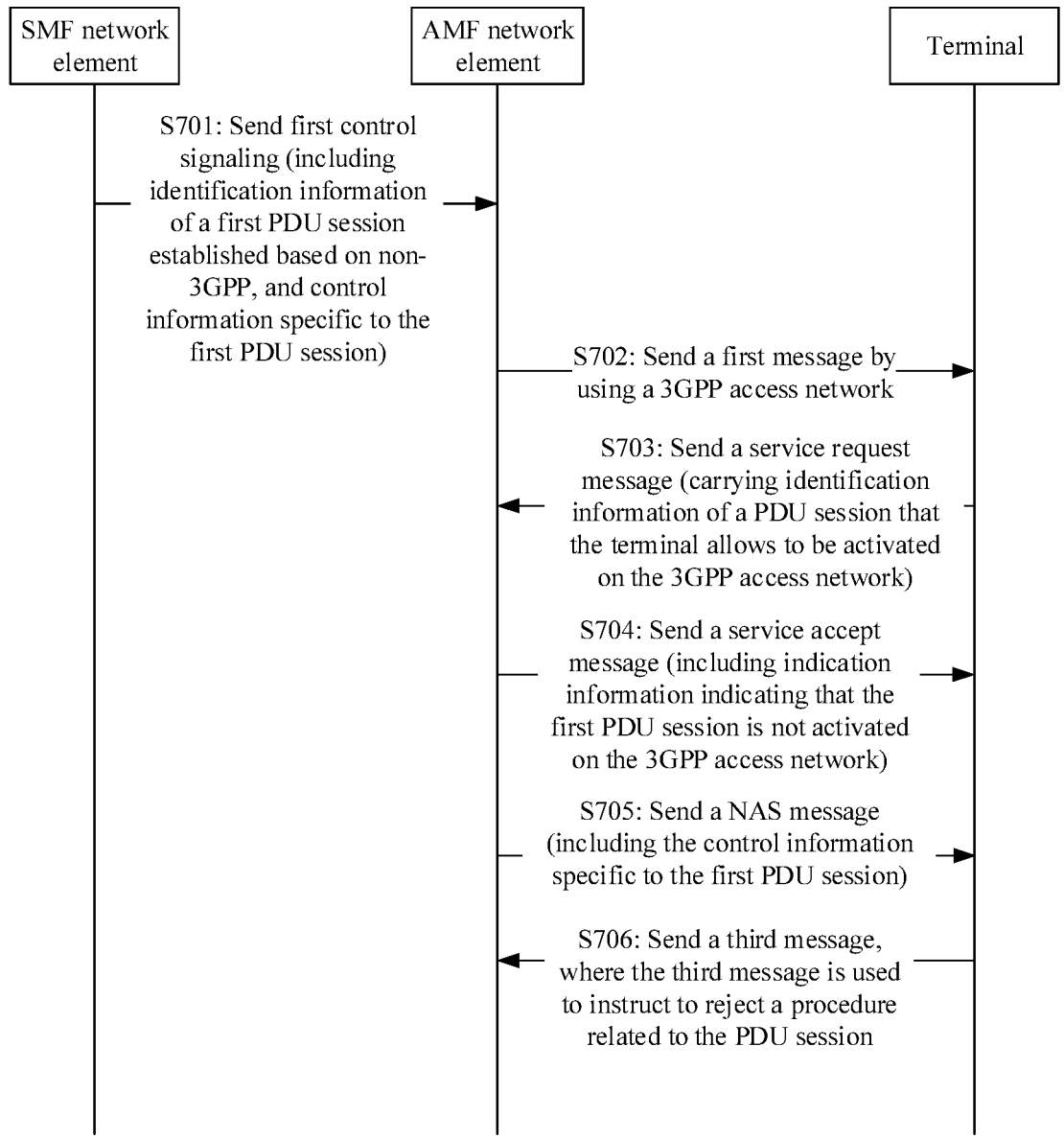
FIG. 15 is a schematic interaction diagram of a message processing method according to an embodiment of this application.

FIG. 15 is a schematic interaction diagram of a message processing method according to an embodiment of this application. The method is an example of the message processing method shown in FIG. 14. The method shown in FIG. 15 may include the following steps.

For S701 to S703, refer to S401 to S403. The "first control signaling" in the embodiment shown in FIG. 15 may be the "control signaling" in the embodiment shown in FIG. 14.

S704: After receiving the service request message from the terminal, if the AMF network element needs to send the control information specific to the first PDU session to the terminal, the AMF network element rejects initiation of a procedure for activating the first PDU session on the 3GPP access network, for example, sends a service accept message to the terminal, where the service accept message includes indication information indicating that the first PDU session is not activated on the 3GPP access network.

Optionally, the following steps may further be performed subsequently.

For S705 and S706, refer to S409 and S410.

An embodiment of this application further provides an information processing system. The information processing system may include an AMF network element and a terminal. The AMF network element may be configured to perform some or all of steps performed by the AMF network element in the embodiment shown in FIG. 11 or FIG. 12A and FIG. 12B. The terminal may be configured to perform some or all of steps performed by the terminal in the embodiment shown in FIG. 11 or FIG. 12A and FIG. 12B. Optionally, the information processing system may further include an SMF network element. For example, the SMF network element may be configured to perform some or all of steps performed by the SMF network element in the embodiment shown in FIG. 12A and FIG. 12B. For another example, the AMF network element, the terminal, and the SMF network element may be configured to perform some or all of respective corresponding steps in the embodiment shown in FIG. 13A or FIG. 13B.

An embodiment of this application further provides an information processing system. The information processing system may include an SMF network element and an AMF network element. For example, the SMF network element may be configured to perform some or all of steps performed by the SMF network element in the embodiment shown in FIG. 14 or FIG. 15. The AMF network element may be configured to perform some or all of steps performed by the AMF network element in the embodiment shown in FIG. 14 or FIG. 15. Optionally, the information processing system may further include a terminal. For example, the terminal may be configured to perform some or all of steps performed by the terminal in the embodiment shown in FIG. 15.

The foregoing mainly describes the solutions provided in the embodiments of this application from a perspective of interaction between different network elements. It can be understood that, to implement the foregoing functions, the access and mobility management network element (such as the AMF network element), the session management network element (such as the SMF network element), and the terminal include hardware structures and/or software modules corresponding to the functions. With reference to the units and algorithm steps described in the embodiments disclosed in this application, the embodiments of this application can be implemented in a form of hardware or a combination of hardware and computer software. Whether a function is performed using hardware or by computer software driving hardware depends on particular applications and design constraints of the technical solutions. A person skilled in the art may use a different method to implement the described functions for each particular application, but it should not be considered that the implementation falls beyond the scope of the technical solutions in the embodiments of this application.

In the embodiments of this application, division of functional units may be performed on the access and mobility management network element, the session management network element, the terminal, and the like based on the foregoing method examples. For example, each functional unit may be obtained through division in correspondence to each function, or at least two functions may be integrated into one processing unit. The integrated unit may be implemented in a form of hardware, or may be implemented in a form of a software functional unit. It should be noted that, unit division in the embodiments of this application is an example, is merely a logical function division, and may be other division in actual implementation.

Figure 7:
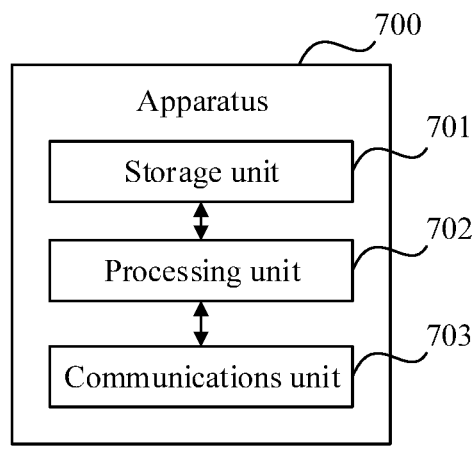
FIG. 7 is a schematic structural diagram of an apparatus according to an embodiment of this application.

When an integrated unit is used, FIG. 7 is a possible example block diagram of an apparatus in the embodiments of this application. The apparatus 700 may be in a form of software, hardware, or a combination of software and hardware. FIG. 7 is the possible example block diagram of the apparatus in the embodiments of this application. The apparatus 700 includes a processing unit 702 and a communications unit 703. The processing unit 702 is configured to control and manage actions of the apparatus, and the communications unit 703 is configured to support communication between the apparatus and another device. The apparatus 700 may further include a storage unit 701 configured to store program code and data of the apparatus.

The apparatus 700 shown in FIG. 7 may be the access and mobility management network element or the session management network element in the embodiments of this application.

When the apparatus 700 shown in FIG. 7 is the access and mobility management network element, the processing unit 702 can support the apparatus 700 in performing actions completed by the access and mobility management network element (such as an AMF network element) in the foregoing method examples. For example, the processing unit 702 supports the apparatus 700 in performing S103 in FIG. 4, S103A in FIG. 5A, S103B in FIG. 5B, S103C in FIG. 5C, S103D in FIG. 5D, S103E in FIG. 5E, and/or another process of the technology described in this specification. The communications unit 703 can support the apparatus 700 in communicating with the session management network element, a terminal, or the like. For example, the communications unit 703 supports the apparatus 700 in performing S102, S104, S106, and S108 in any one of FIG. 4 and FIG. 5A to FIG. 5E, and/or another related communication process. For example, the communications unit 703 supports the apparatus 700 in performing S602 in FIG. 14 and/or another related communication process, and the processing unit 702 supports the apparatus 700 in performing S603 in FIG. 14 and/or another related communication process. For another example, the communications unit 703 supports the apparatus 700 in performing S702 to S706 in FIG. 15 and/or another related communication process.

When the apparatus 700 shown in FIG. 7 is the session management network element, the communications unit 703 can support the apparatus 700 in communicating with the access and mobility management network element or the like. For example, the communications unit 703 supports the apparatus 700 in performing S101, and S105 in any one of FIG. 4 and FIG. 5A to FIG. 5E, and/or another related communication process. For example, the communications unit 703 supports the apparatus 700 in performing S601 in FIG. 14. For example, the processing unit 702 supports the apparatus 700 in performing S501A in FIG. 13A and/or another related communication process, and the communications unit 703 supports the apparatus 700 in performing S502A in FIG. 13A and/or another related communication process. For example, the processing unit 702 supports the apparatus 700 in performing S501B in FIG. 13B and/or another related communication process, and the communications unit 703 supports the apparatus 700 in performing S502B in FIG. 13B and/or another related communication process.

For example, the processing unit 702 may be a processor or a controller, such as a central processing unit (CPU), a general purpose processor, a digital signal processor (DSP), an application-specific integrated circuit (ASIC), a field-programmable gate array (FPGA), another programmable logic device, a transistor logic device, a hardware component, or a combination thereof. The processing unit 702 may implement or execute various example logical blocks, units, and circuits described with reference to content disclosed in this application. Alternatively, the processor may be a combination implementing a computing function, for example, a combination including one or more microprocessors or a combination of a DSP and a microprocessor. The communications unit 703 may be a communications interface, and the communications interface is a generic term. The communications interface may include one or more interfaces during specific implementation. The storage unit 701 may be a memory.

Figure 8:
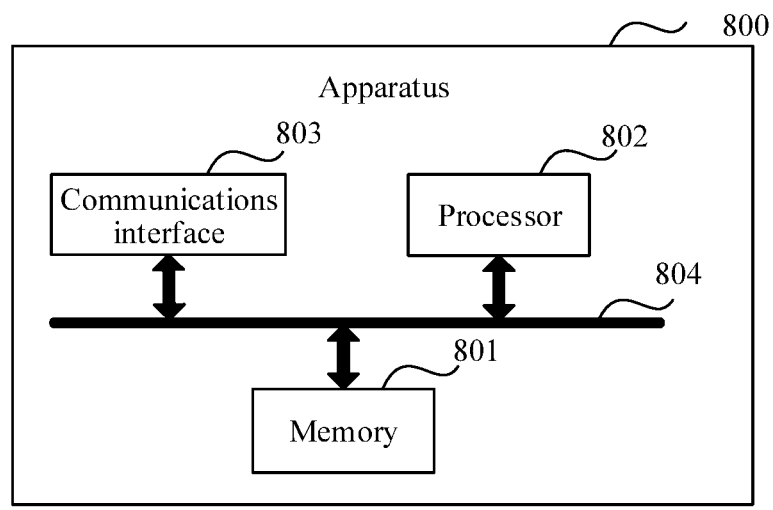
FIG. 8 is a schematic structural diagram of an apparatus according to an embodiment of this application.

When the processing unit 702 is a processor, the communications unit 703 is a communications interface, and the storage unit 701 is a memory, the apparatus 700 in the embodiments of this application may be an apparatus 800 shown in FIG. 8.

Referring to FIG. 8, the apparatus 800 includes a processor 802 and a communications interface 803. Further, the apparatus 800 may further include a memory 801. Optionally, the apparatus 800 may further include a bus 804. The communications interface 803, the processor 802, and the memory 801 may be connected to each other through the bus 804. The bus 804 may be a Peripheral Component Interconnect (PCI) bus, an Extended Industry Standard Architecture (EISA) bus, or the like. The bus 804 may be classified into an address bus, a data bus, a control bus, and the like. For ease of representation, the bus is represented using only one thick line in FIG. 8, but this does not mean that there is only one bus or only one type of bus.

The processor 802 can perform various functions of the apparatus 800 by running or executing a program stored in the memory 801.

For example, the apparatus 800 shown in FIG. 8 may be the access and mobility management network element or the session management network element in the embodiments of this application.

When the apparatus 800 is the access and mobility management network element, the processor 802 can perform actions completed by the access and mobility management network element in the foregoing method examples by running or executing the program stored in the memory 801.

When the apparatus 800 is the session management network element, the processor 802 can perform actions completed by the session management network element in the foregoing method examples by running or executing the program stored in the memory 801.

Figure 9:
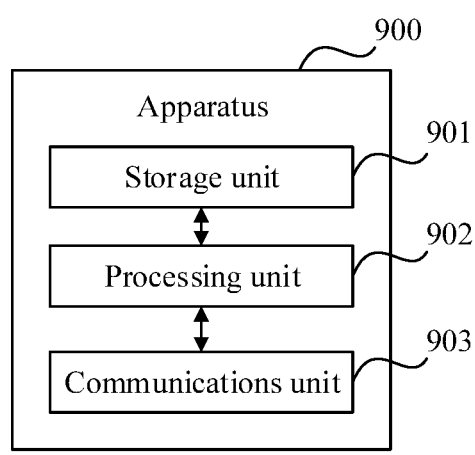
FIG. 9 is a schematic structural diagram of an apparatus according to an embodiment of this application.

When an integrated unit is used, FIG. 9 is a possible example block diagram of another apparatus in the embodiments of this application. The apparatus 900 may be in a form of software, hardware, or a combination of software and hardware. FIG. 9 is the possible example block diagram of the apparatus in the embodiments of this application. The apparatus 900 includes a processing unit 902 and a communications unit 903. The processing unit 902 is configured to control and manage actions of the apparatus, and the communications unit 903 is configured to support communication between the apparatus and another device. The apparatus may further include a storage unit 901 configured to store program code and data of the apparatus.

The apparatus 900 shown in FIG. 9 may be a terminal or a chip applied to a terminal. The processing unit 902 can support the apparatus 900 in performing actions completed by the terminal in the foregoing method examples. For example, the processing unit 902 supports the apparatus 900 in initiating the processing procedure related to the PDU session corresponding to the notification message in S107 and S109 in any one of FIG. 4 and FIG. 5A to FIG. 5E, and/or another process of the technology described in this specification. The communications unit 903 can support the apparatus 900 in communicating with the access and mobility management network element or the like. For example, the communications unit 903 supports the apparatus 900 in performing the step for receiving in S109 in any one of the accompanying drawings FIG. 4 and FIG. 5A to FIG. 5E, and/or another related communication process. For example, the communications unit 903 can support the apparatus 900 in performing S302 and S303 in FIG. 11 and/or another related communication process. For example, the communications unit 903 can support the apparatus 900 in performing S402, S403, S405/S407, S409, and S410 in FIG. 12A and FIG. 12B and/or another related communication process. The processing unit 902 can support the apparatus 900 in performing S408 in FIG. 12A and FIG. 12B and/or another related communication process.

For example, the processing unit 902 may be a processor or a controller, such as a CPU, a general purpose processor, a DSP, an ASIC, an FPGA, or another programmable logic device, a transistor logic device, a hardware component, or any combination thereof. The processing unit 902 may implement or execute various example logical blocks, units, and circuits described with reference to content disclosed in this application. Alternatively, the processor may be a combination implementing a computing function, for example, a combination including one or more microprocessors or a combination of a DSP and a microprocessor. The communications unit 903 may be a communications interface, and the communications interface is a generic term. The communications interface may include one or more interfaces during specific implementation. The storage unit 901 may be a memory.

Figure 10:
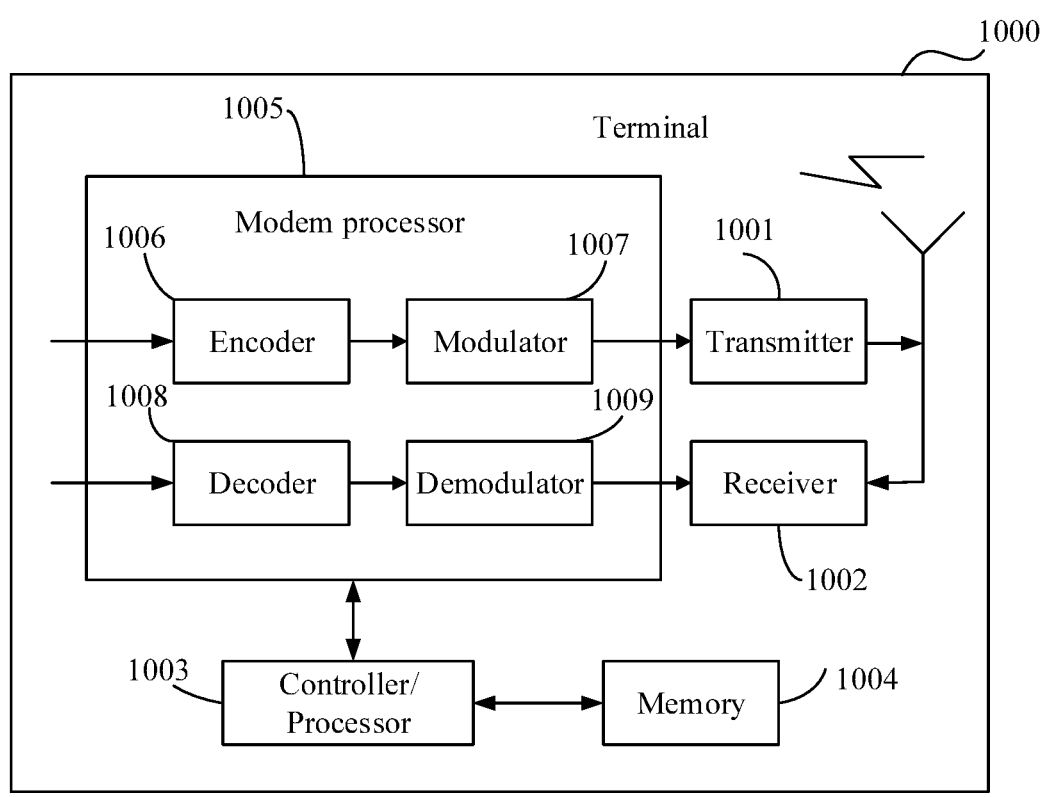
FIG. 10 is a schematic structural diagram of an apparatus according to an embodiment of this application.

When the processing unit 902 is a processor, the communications unit 903 is a transceiver, and the storage unit 901 is a memory, the apparatus 900 in the embodiments of this application may be a terminal shown in FIG. 10.

FIG. 10 is a simplified schematic diagram of a possible design structure of a terminal in the embodiments of this application. The terminal 1000 includes a transmitter 1001, a receiver 1002, and a processor 1003. The processor 1003 may alternatively be a controller, and is represented as a "controller/processor 1003" in FIG. 10. Optionally, the terminal 1000 may further include a modem processor 1005, and the modem processor 1005 may include an encoder 1006, a modulator 1007, a decoder 1008, and a demodulator 1009.

In an example, the transmitter 1001 adjusts (for example, analog converts, filters, amplifies, and up-converts) an output sample and generates an uplink signal. The uplink signal is transmitted by an antenna to the base station in the foregoing embodiments. Over a downlink, the antenna receives a downlink signal transmitted by the base station in the foregoing embodiments. A receiver 1002 adjusts (for example, filters, amplifies, down-converts, and digitalizes) the signal received from the antenna and provides an input sample. In the modem processor 1005, the encoder 1006 receives service data and a signaling message that are to be sent over an uplink, and processes (for example, formats, encodes, and interleaves) the service data and the signaling message. The modulator 1007 further processes (for example, performs symbol mapping and modulation) encoded service data and an encoded signaling message and provides an output sample. The demodulator 1009 processes (for example, demodulates) the input sample and provides symbol estimation. The decoder 1008 processes (for example, de-interleaves and decodes) the symbol estimation and provides decoded data and a decoded signaling message that are to be sent to the terminal 1000. The encoder 1006, the modulator 1007, the demodulator 1009, and the decoder 1008 may be implemented by the combined modem processor 1005. These units perform processing using a radio access technology (for example, an access technology for an LTE system, a 5G system, and other evolved systems) used for a radio access network. It should be noted that when the terminal 1000 does not include the modem processor 1005, the foregoing functions of the modem processor 1005 may alternatively be completed by the processor 1003.

The processor 1003 controls and manages actions of the terminal 1000 and is configured to perform the processing procedures performed by the terminal 1000 in the embodiments of this application. For example, the processor 1003 is further configured to perform the processing procedures related to the terminal in the methods shown in FIG. 4 and FIG. 5A to FIG. 5E and/or another process of the technical solutions described in this application.

Further, the terminal 1000 may further include a memory 1004, where the memory 1004 is configured to store program code and data of the terminal 1000.

Methods or algorithm steps described in combination with the content disclosed in the embodiments of this application may be implemented by hardware, or may be implemented by a processor executing a software instruction. The software instruction may include a corresponding software module. The software module may be stored in a random-access memory (RAM), a flash memory, a read-only memory (ROM), an erasable programmable ROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor such that the processor can read information from the storage medium and write information into the storage medium. Certainly, the storage medium may alternatively be a component of the processor. The processor and the storage medium may be located in an ASIC. In addition, the ASIC may be located in the access and mobility management network element, the session management network element, or the terminal. Certainly, the processor and the storage medium may alternatively be located in the access and mobility management network element, the session management network element, or the terminal as discrete assemblies.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general purpose computer or a dedicated computer.

In the foregoing specific implementations, the objectives, technical solutions, and beneficial effects of the embodiments of this application are further described in detail. It should be understood that the foregoing descriptions are merely specific implementations of the embodiments of this application, but are not intended to limit the protection scope of the embodiments of this application. Any modification, equivalent replacement, improvement, or the like made based on the technical solutions in the embodiments of this application shall fall within the protection scope of the embodiments of this application.

What is claimed is:

1. A signaling processing method implemented by an access and mobility management network element, wherein the signaling processing method comprises:
    receiving, from a session management network element, control signaling comprising identification information of a protocol data unit (PDU) session of a terminal, wherein the PDU session is established based on a non-3rd Generation Partnership Project (3GPP) access network; and
    sending, using a 3GPP access network based on the control signaling, a first message to the terminal when the terminal is in an idle mode on the non-3GPP access network and the control signaling does not comprise first indication information.

2. The signaling processing method of claim 1, wherein the first message comprises a paging message, and wherein the signaling processing method further comprises sending the paging message to the terminal using the 3GPP access network to indicate the terminal to initiate a service request procedure when the terminal is in the idle mode on the 3GPP access network.

3. The signaling processing method of claim 1, wherein the first message comprises a notification message, and wherein the signaling processing method further comprises sending the notification message to the terminal using the 3GPP access network to indicate the terminal to initiate at least one of a PDU session establishment procedure or a PDU session release procedure when the terminal is in a connected mode on the 3GPP access network.

4. The signaling processing method of claim 1, further comprising sending, to the session management network element, a response message comprising second indication information which indicates that the terminal is unreachable when the terminal is in the idle mode on the non-3GPP access network and the control signaling comprises the first indication information.

5. The signaling processing method of claim 1, wherein the control signaling is N1N2 message transfer signaling.

6. The signaling processing method of claim 1, wherein the control signaling is in any one of the following procedures:
    a PDU session release procedure;
    a PDU session modification procedure; or
    a session and service continuity and user plane function management procedure.

7. The signaling processing method of claim 6, wherein the first message comprises a PDU session modification command when the control signaling is in the PDU session modification procedure.

8. A signaling processing method comprising:
- determining, by a session management network element, control signaling comprising identification information of a protocol data unit (PDU) session of a terminal, wherein the PDU session is established based on a non-3rd Generation Partnership Project (3GPP) access network;
- sending, by the session management network element, the control signaling to an access and mobility management network element;
- receiving, by the access and mobility management network element, the control signaling from the session management network element; and
- sending, by the access and mobility management network element based on the control signaling, a first message to the terminal using a 3GPP access network when the terminal is in an idle mode on the non-3GPP access network and the control signaling does not comprise first indication information.

9. The signaling processing method of claim 8, wherein the first message comprises a paging message, and wherein the signaling processing method further comprises sending, by the access and mobility management network element, the paging message to the terminal using the 3GPP access network to indicate the terminal to initiate a service request procedure when the terminal is in the idle mode on the 3GPP access network.

10. The signaling processing method of claim 8, wherein the first message comprises a notification message, and wherein the signaling processing method further comprises sending, by the access and mobility management network element, the notification message to the terminal using the 3GPP access network to indicate the terminal to initiate at least one of a PDU session establishment procedure or a PDU session release procedure when the terminal is in a connected mode on the 3GPP access network.

11. The signaling processing method of claim 8, further comprising:
- sending, by the access and mobility management network element to the session management network element, a response message comprising second indication information which indicates that the terminal is unreachable when the terminal is in the idle mode on the non-3GPP access network and the control signaling comprises the first indication information; and
- receiving, by the session management network element, the response message from the access and mobility management network element.

12. The signaling processing method of claim 8, wherein the control signaling is N1N2 message transfer signaling.

13. The signaling processing method of claim 8, wherein the control signaling is in any one of the following procedures:
- a PDU session release procedure;
- a PDU session modification procedure; or
- a session and service continuity and user plane function management procedure.

14. An apparatus comprising:
- a memory configured to store program instructions; and
- a processor coupled to the memory, wherein the program instructions cause the processor to be configured to:
  - receive, from a session management network element, control signaling comprising identification information of a protocol data unit (PDU) session of a terminal, wherein the PDU session is established based on a non-3rd Generation Partnership Project (3GPP) access network; and
  - send, using a 3GPP access network based on the control signaling, a first message to the terminal when the terminal is in an idle mode on the non-3GPP access network and the control signaling does not comprise first indication information.

15. The apparatus of claim 14, wherein the first message comprises a paging message, and wherein the program instructions further cause the processor to be configured to send the paging message to the terminal using the 3GPP access network to indicate the terminal to initiate a service request procedure when the terminal is in the idle mode on the 3GPP access network.

16. The apparatus of claim 14, wherein the first message comprises a notification message, and wherein the program instructions further cause the processor to be configured to send the notification message to the terminal using the 3GPP access network to indicate the terminal to initiate at least one of a PDU session establishment procedure or a PDU session release procedure when the terminal is in a connected mode on the 3GPP access network.

17. The apparatus of claim 14, wherein the program instructions further cause the processor to be configured to send, to the session management network element, a response message comprising second indication information which indicates that the terminal is unreachable when the terminal is in the idle mode on the non-3GPP access network and the control signaling comprises the first indication information.

18. The apparatus of claim 14, wherein the control signaling is N1N2 message transfer signaling.

19. The apparatus of claim 14, wherein the control signaling is in any one of the following procedures:
- a PDU session release procedure;
- a PDU session modification procedure; or
- a session and service continuity and user plane function management procedure.

20. The apparatus of claim 19, wherein the first message comprises a PDU session modification command when the control signaling is in the PDU session modification procedure.

* * * * *